Jan. 12, 1965  S. J. GARTNER  3,165,126
CUTTING MECHANISM FOR ASSEMBLING APPARATUS AND METHODS
Original Filed Jan. 29, 1954  13 Sheets-Sheet 1

INVENTOR.
STANLEY J. GARTNER
BY
ATTORNEYS

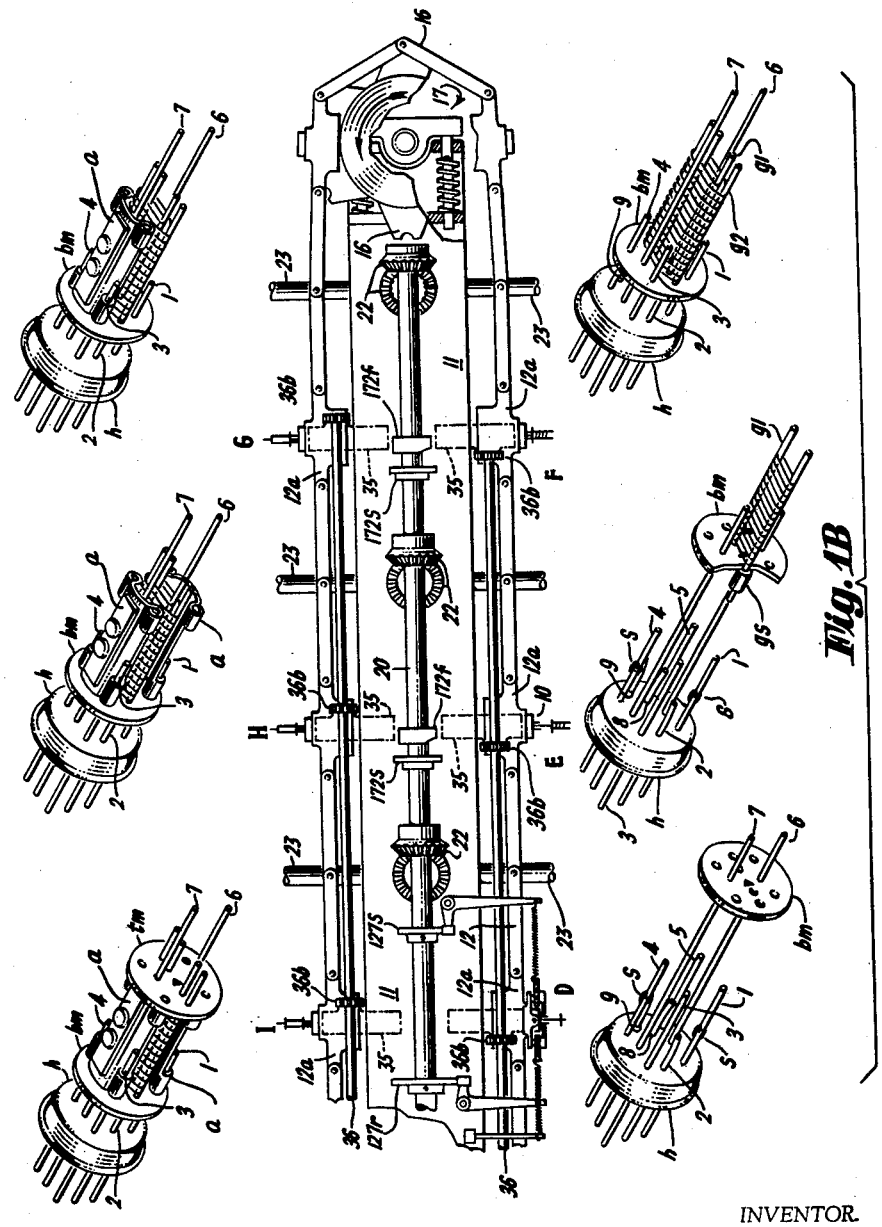

INVENTOR.
STANLEY J. GARTNER
BY
ATTORNEYS

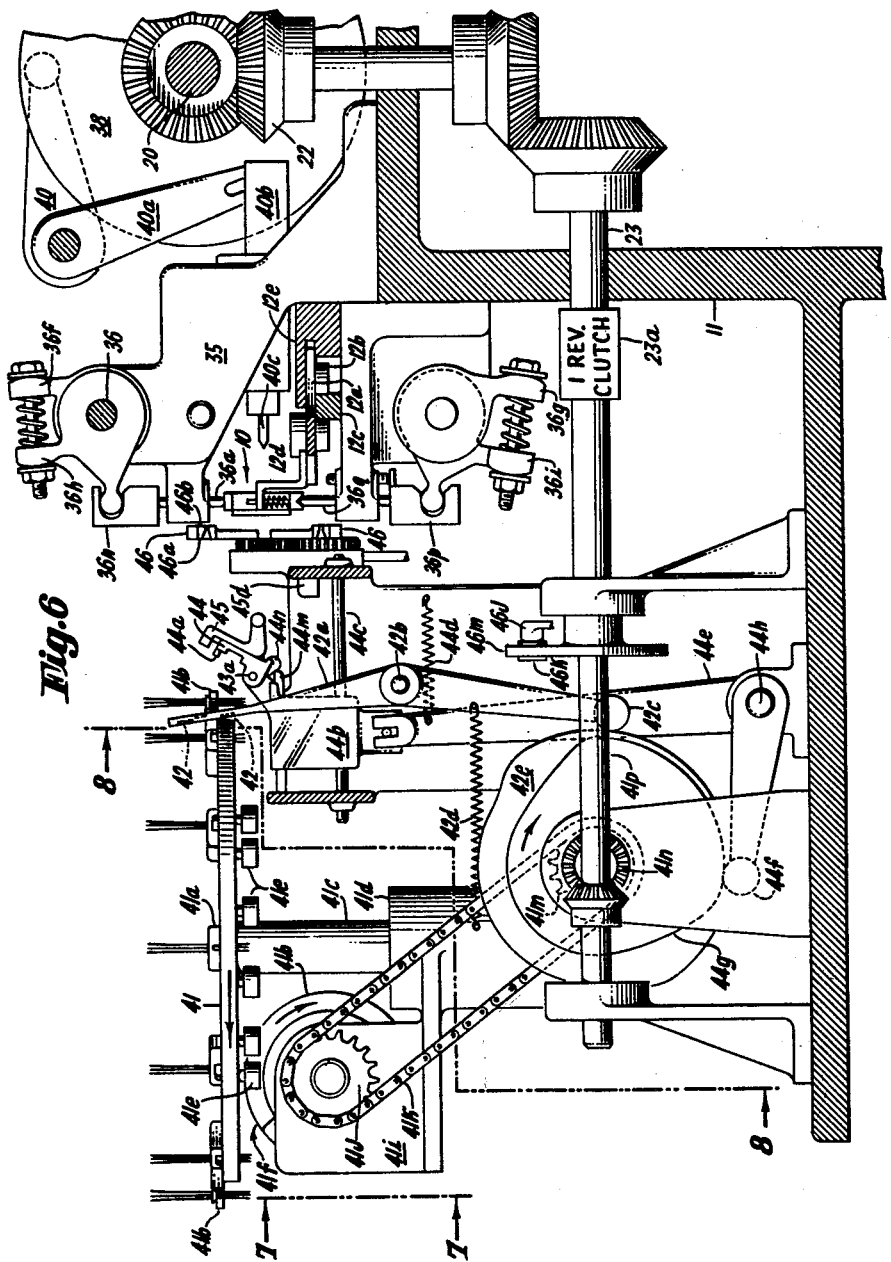

Jan. 12, 1965 S. J. GARTNER 3,165,126
CUTTING MECHANISM FOR ASSEMBLING APPARATUS AND METHODS
Original Filed Jan. 29, 1954 13 Sheets-Sheet 5
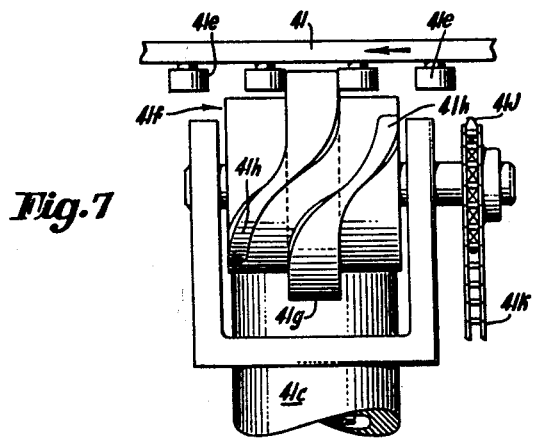
Fig. 7
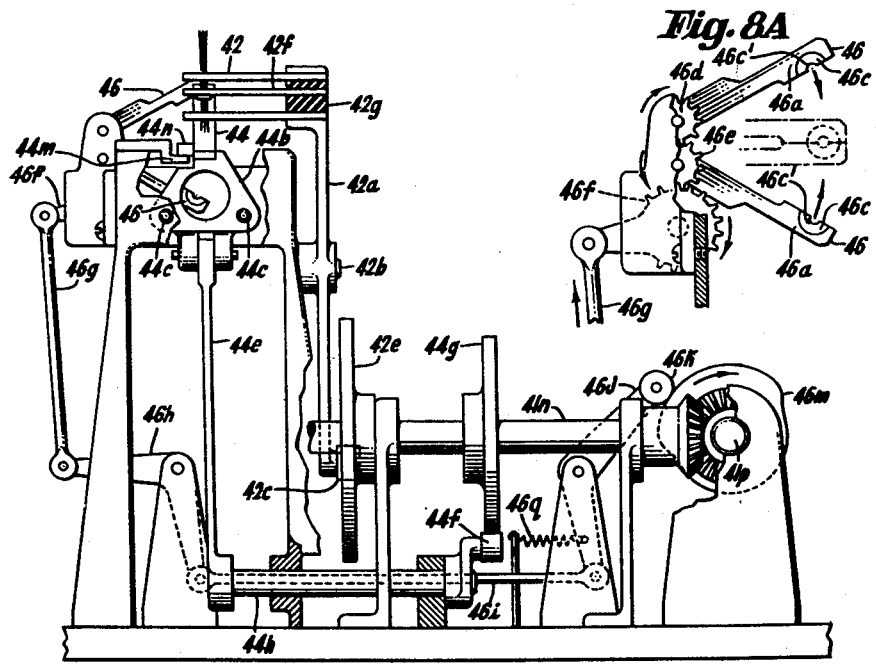
Fig. 8A
Fig. 8
INVENTOR.
STANLEY J. GARTNER
BY
ATTORNEYS

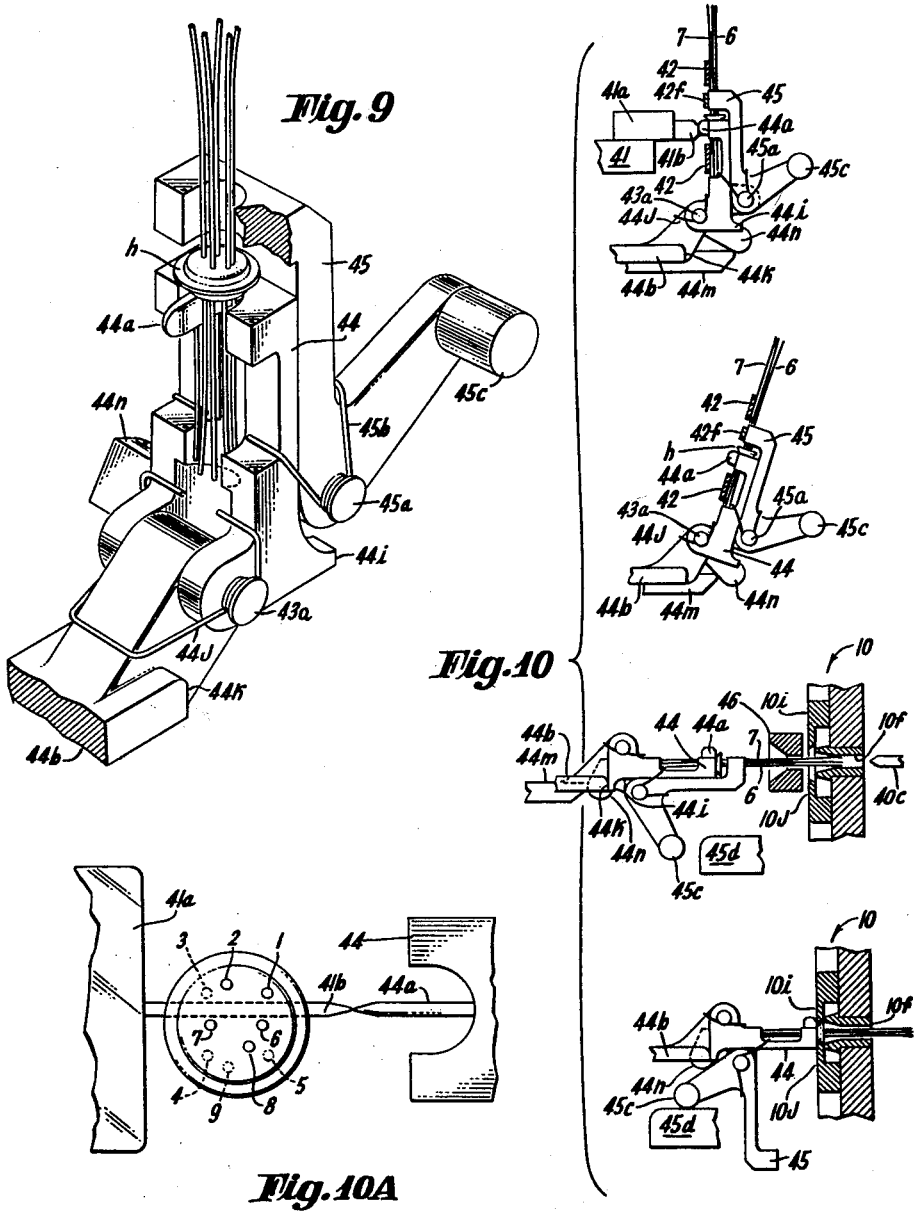

INVENTOR.
STANLEY J. GARTNER
BY
ATTORNEYS

Jan. 12, 1965 S. J. GARTNER 3,165,126
CUTTING MECHANISM FOR ASSEMBLING APPARATUS AND METHODS
Original Filed Jan. 29, 1954 13 Sheets-Sheet 8

INVENTOR.
STANLEY J. GARTNER
BY
ATTORNEYS

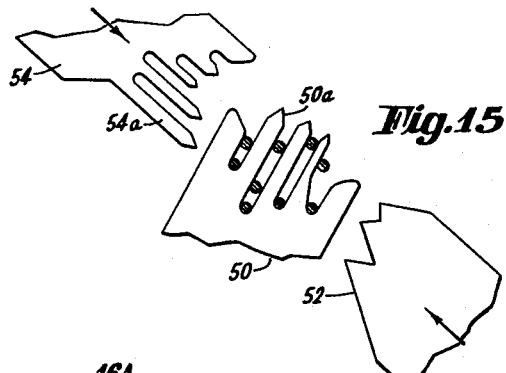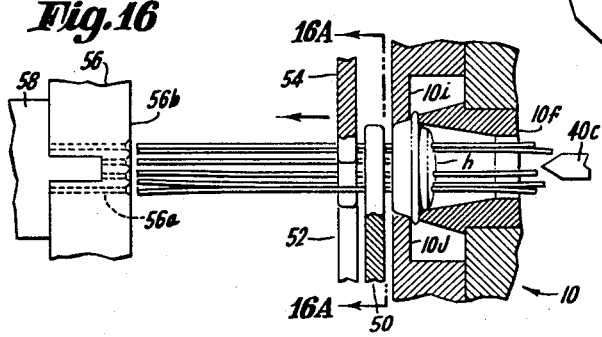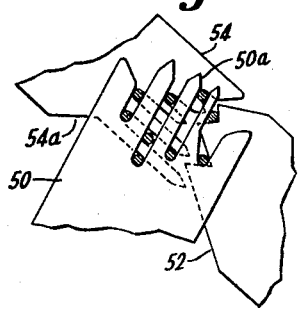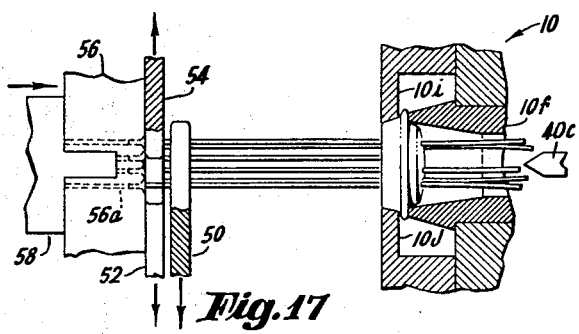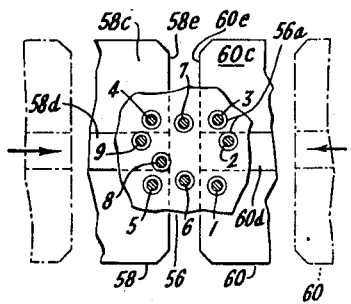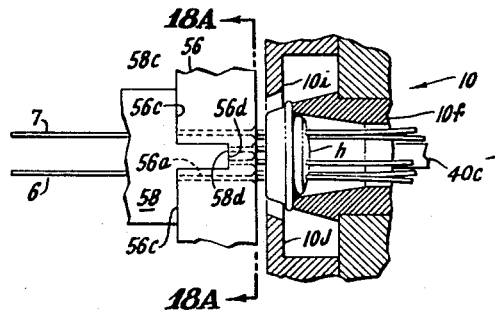

Jan. 12, 1965 S. J. GARTNER 3,165,126
CUTTING MECHANISM FOR ASSEMBLING APPARATUS AND METHODS
Original Filed Jan. 29, 1954 13 Sheets-Sheet 10

INVENTOR.
STANLEY J. GARTNER
BY Amster & Levy
ATTORNEYS

INVENTOR.
STANLEY J. GARTNER
BY Amster & Levy
ATTORNEYS

United States Patent Office 3,165,126
Patented Jan. 12, 1965

3,165,126
CUTTING MECHANISM FOR ASSEMBLING
APPARATUS AND METHODS
Stanley J. Gartner, Emporium, Pa., assignor, by mesne assignments, to Sylvania Electric Products Inc., Wilmington, Del., a corporation of Delaware
Application Feb. 7, 1962, Ser. No. 171,745, which is a division of application Ser. No. 406,930, Jan. 29, 1954, now Patent No. 3,069,749, dated Dec. 25, 1962. Divided and this application Sept. 19, 1963, Ser. No. 309,937
6 Claims. (Cl. 140—140)

This application is a division of application Serial No. 171,745 filed February 7, 1962 which is a division of application Serial No. 406,930, now U.S. Patent No. 3,069,-749 of December 25, 1962.

The present invention relates generally to cutting mechanisms used in connection with methods and apparatus for automatically assembling parts, particularly the component parts of a mount or electrode assembly of an electronic tube or the like.

During the several decades of technical development and commercial exploitation of vacuum tubes and the like there has been a persistent need for improved methods of assembly and for automatic assembling apparatus for the electrodes of such devices. Some early machines were devised that were adapted to assemble simple types of mounts but even these were unsuccessful to my knowledge.

For many years, tubes have included many electrodes, and with the development of the hearing aid and the proximity fuze, the dimensions of many types of tubes have been greatly reduced. It will be recognized that as mounts are made progressively smaller, manual assembly without deforming the delicate electrodes becomes progressively more difficult. In the event that a mount is assembled imperfectly, perhaps including a deformed electrode, the defective nature of the mount may not be detected until after the mount is sealed in its envelope as finally exhausted and completed. At this stage, it is revealed as defective after it represents a far greater expenditure that is represented by the mount itself. In other words, manual assembly techniques tend to deform the electrodes in such a way that defective mounts are often detected after the tube construction has advanced to an expensive stage. The methods and apparatus provided by the tube construction has advanced to an expensive stage. The methods and apparatus provided by the present invention vastly reduce this tendency to deform electrodes; and any deformation produced occasionally is so prominent as to be immediately detected and the mount can be rejected while still representing comparatively small cost.

It is accordingly an important object of the present invention to provide new and improved methods and apparatus for automatically assembling electronic tube mounts and the like. A further object is to automatically assemble electrodes of even small and complicated mounts in rapid, precise and automatic routine.

In the illustrative embodiment of the invention detailed below the electrodes are assembled in proper mutual relationship. The mount as finished in the disclosed embodiment includes a "stem" on which the electrode assembly is supported, the stem consisting of a glass button or header through which are sealed a set of wires. These serve as terminal connectors and mechanical supports of the electrodes later assembled on the wires. The header usually serves as the end of a tube envelope.

Stems are ordinarily prepared in molding machines which locate the wires in the glass header with relatively broad tolerance. A feature of the present invention is in the "tailoring" or trimming of the leads to accurately determined lengths; and a further feature is in the adjustment of the lead positions to close tolerance, for consistent and reliable operation of the assembling machine and further to assure consistent, accurate duplication of the automatically assembled mounts. In accomplishing this purpose the machine handles the stems and is effective to adjust the way in which the stems are held so as to perfect the positioning of the wires; and that effect is further enhanced by devices which trim certain of the wires to critical lengths spaced from the glass portion and to bend certain of the wires, where necessary, into the optimum pattern on which the remainder of the operations depend.

The machine includes a conveyor which carries a number of work holders from each of a series of stations to the next, step-wise. Because of the small dimensions of the illustrative mount being assembled and the consequent close tolerances involved it is important that the conveyor should consistently advance the work holders to an accurate position in each station. Ordinary conveyor mechanisms such as the usual chain conveyor tend to introduce slack and in this way tend to defeat the objective of accurate transport of the work holders. A feature of this invention resides in a conveyor having unusually large links and correspondingly having relatively few links. A subsidiary feature relates to the conveyor that is disposed about a pair of sprockets one of which is movable to and from the other so as to accommodate the travel of the large links about those sprockets. The use of an odd number of links minimizes the motion of the movable sprocket, and the consequent impacts on the frame and in the drive are minimized.

In the illustrative machine, the previously molded glass-and-wire stems are loaded manually onto a conveyor plate with rough preliminary orientation. A feature of the invention resides in the techniques and mechanisms for handling the glass-and-wire stem during its transfer from the initial feed plate to the work holders of the main conveyor, so as to preserve and improve the initial orientation and to effect this transfer in a simple manner well suited to specialized forms of stems.

The completed mount in this illustrative disclosure involves parallel insulated discs customarily of pierced mica which fix the spacing between the electrodes precisely. As previously mentioned the wires of the stem are adjusted in the machine into an accurate pattern. In this illustrative machine an important feature is in the provision of a piercing die for forming the holes in the mica while each mica is held in the very element utilized to transfer and apply the mica to stem wires and, in the case of the top mica, to certain of the electrodes.

That portion of the machine which locates the stem in the work-holder and trims the wires to critical lengths constitutes a useful combination; but if the machine accomplished no more, it might well be considered uneconomical. Ordinarily, stems are manually inserted into a trimming die. An important feature of this invention is in not merely trimming the stem leads, but accomplishing the further mount-assembly operations on the stem as trimmed and oriented in the trimming operation. The consistent orientation of the stems and the consistent trimming of the leads at a uniform distance from the work-holder establishes a uniform condition of the stem utilized in assembly of the additional parts, with consistent accuracy and success.

The first mica to be assembled has an accurate pattern of pierced holes. Certain stem wires enter certain of the pierced holes in the mica when the mica is assembled to the stem. Those wires are then engaged and utilized in subsequent assembly operations, to pick up and accurately locate the mica so that electrodes may automatically be assembled to the mica with portions of those electrodes extending through additional pierced holes in the mica. The mica is oriented indirectly.

A further feature of the present invention resides in the insertion of the side rods of the usual helically wound grid holes pierced in a mica after the mica is on the stem wires. This is accomplished by applying the mica to the stem wires at an intermediate position and to supply thrust-resisting backing for the mica while inserting the grid, and finally the grid and mica are pushed all the way to the short wires on the stem. A further feature resides in the welding of a grip stop to one of the grid side rods so as to prevent appreciable shifting of the grid in the completed tube, and to accomplish this despite extremely small dimensions involved in the illustrative mount to which the invention is applied. This is accomplished when the mica is at an intermediate position (such that both sides of the mica are easily accessible) and after grid insertion. The stop is applied to the grid side rod with the mica in this position, and thereafter the mica and grid subassembly is advanced to its final position on the stem wires. The welding tools serve not only to weld, but to transport the grid stop to position and to furnish thrust resistance behind the mica during insertion of the grid.

A further feature of the invention resides in the assembly of a second grid telescopically about the first while the first mica is in the intermediate position and with the side rods of the second grid penetrating the prepared holes in the mica, and thereafter advancing the subassembly of two grids and the mica to the final position on the wires of the stem.

In the illustrative disclosure it will be seen that the two grids function with two long stem wires as electrodes of a pentode; and a two-part anode in the form of two preformed anode plates is automatically assembled to the mount thus far completed.

In this machine a second mica is applied to the projecting ends of the electrodes opposite the first mica; and a further part is assembled to the mount to lock the mica in place and to interconnect the parts of a two-part anode. One of those electrodes that penetrates the top mica is seized and oriented for indirectly orienting the top mica in this assembling operation, a feature that is found in other form in the grid-mounting stations.

A desirable minimum number of welding operations is effected for permanently retaining the assembly of the electrodes and other parts in the initial accurate configuration produced by the uniformly repeated operations of the machine.

Included in several stations are various important forms of tools which, like the gathering tools in the cutting station, embrace the parts of the partial mount while a further component is advanced into place. An especially useful and novel form of gathering tool used in combination with assembling mechanisms in several of the stations involves jaws which close on each other and, when closed, present a pattern of apertures with flared openings facing the stem holder. They advance on and receive the stem wires, and having established orientation desired for an assembly operation, are laterally separated and withdrawn. Certain split tools have flared openings facing toward the stem and flared openings facing away from the stem. These advance on the stem to receive and orient a pattern of wires while also acting to direct a further part, such as a grid or an anode part, in a precise path toward the partial mount. These and further detailed yet important features of the invention will be better appreciated from the specific description of the various tools involved.

In the event of misoperation, it may happen that a mount is deformed by the apparatus. Such deformed mount is prominently defective and is readily detected upon inspection and rejected as it emerges from the machine, long before it can reach the envelope sealing and evacuating stage of manufacture of electron tubes. This is a valuable aspect of the invention. The mount as it emerges at the assembling stage of tube manufacture can be rejected at low cost if it should be found defective. In contrast, manually assembled mounts with no prominent visual defect are assembled into completed, sealed and exhausted tubes, and at this stage there is a very substantial rate of rejection. The rate of rejection of completed tubes containing mounts prepared under the present invention is sharply reduced.

Further features of novelty will be appreciated from the illustrative disclosures that follows. It will naturally be understood that certain aspects and features of the described embodiment may be omitted as required and that certain features are useful in other combinations. However the entire organization is admirably adapted to achieve the broad purposes of assembling and uniting the electrodes of a mount, particularly in assembling numerous electrodes of a subminiature mount. In the detailed disclosure reference is made to the accompanying drawings forming part of the present disclosure. In the drawings:

FIGS. 1A and 1B are a plan view of an illustrative mount machine embodying features of the present invention, including the work conveyor and portions of the coordinating drive and cam mechanisms of the various work stations, showing in greatly enlarged perspective the progress of a typical mount during passage through the several work stations of the machine but omitting those stations;

FIG. 6 is an elevation, certain parts sectioned and broken away, showing portions of the mechanism of FIG. 1A together with the stem-loading mechanisms as station A of FIG. 1A.

FIG. 7 is an enlarged fragmentary elevation, viewed generally from the line 7—7 of FIG. 6 and looking in the direction of the arrows showing the turret indexing mechanism;

FIG. 8 is an elevation, with some parts broken away and shown in section taken substantially along the line 8—8 of FIG. 6 and looking in the direction of the arrows showing the details of transfer fingers for displacing successive stems from the feed turret onto a two part transfer member;

FIG. 8A is an elevation showing the details of a split funnel guide interposed between the transfer member and the stem block in FIG. 6;

FIG. 9 is a perspective view showing the details of the two part transfer member of FIG. 6 with a stem loaded therein ready for transfer;

FIG. 10 is a four stage progressive illustration of the transfer member of FIG. 6 in successive positions of movement from receiving a stem at the feed turret to delivering the stem through the split guide to the stem block;

FIG. 10A is an enlarged fragmentary plan view showing a stem on the feed turret together with part of the transfer member, as viewed just prior to the first diagrammatic showing of FIG. 10;

FIG. 15 is a greatly enlarged diagrammatic view, as seen from the stem block at the lead-trimming station B, showing details of the combing and gathering tools as partially engaged with the projecting leads of a stem shown in cross-section;

FIG. 16 is an enlarged elevation, with parts in section, showing the tools of FIGS. 11 through 14 engaged about the projecting stem leads or wires immediately adjacent the molded base of the stem preparatory to the combing operation, together with the cutting die that is shown along a thrust path spaced from the free extremities of the uncombed leads;

FIG. 16A is a view taken along the line 16A—16A of FIG. 16, showing the combing and gathering tools following the partially retracted position of FIG. 15 and fully engaged about the leads;

FIG. 17 is a view somewhat similar to FIG. 16 but showing the combing and gathering tools at the end of their combing stroke away from the stem block and prior to being withdrawn, the cutting die having advanced over the patterned ends of the leads;

FIG. 18 is a view showing the final stage of operation at the lead-trimming station B in which the combing and gathering tools have been withdrawn, the cutting die has advanced to the end of its forward stroke toward the stem block, and the jaws of the stem block have opened to permit rotational orientation of the stem block by the advanced cutting die;

FIG. 18A is an elevation in section along the line of 18A—18A of FIG. 18 and looking in the direction of the arrows, with parts broken away and in section, showing opposed cutters in operative position for cutting predetermined leads of the stem to various lengths, the retracted positions of the opposed movable cutters being shown by the dot-dash lines;

*Introduction*

Figure 1A:
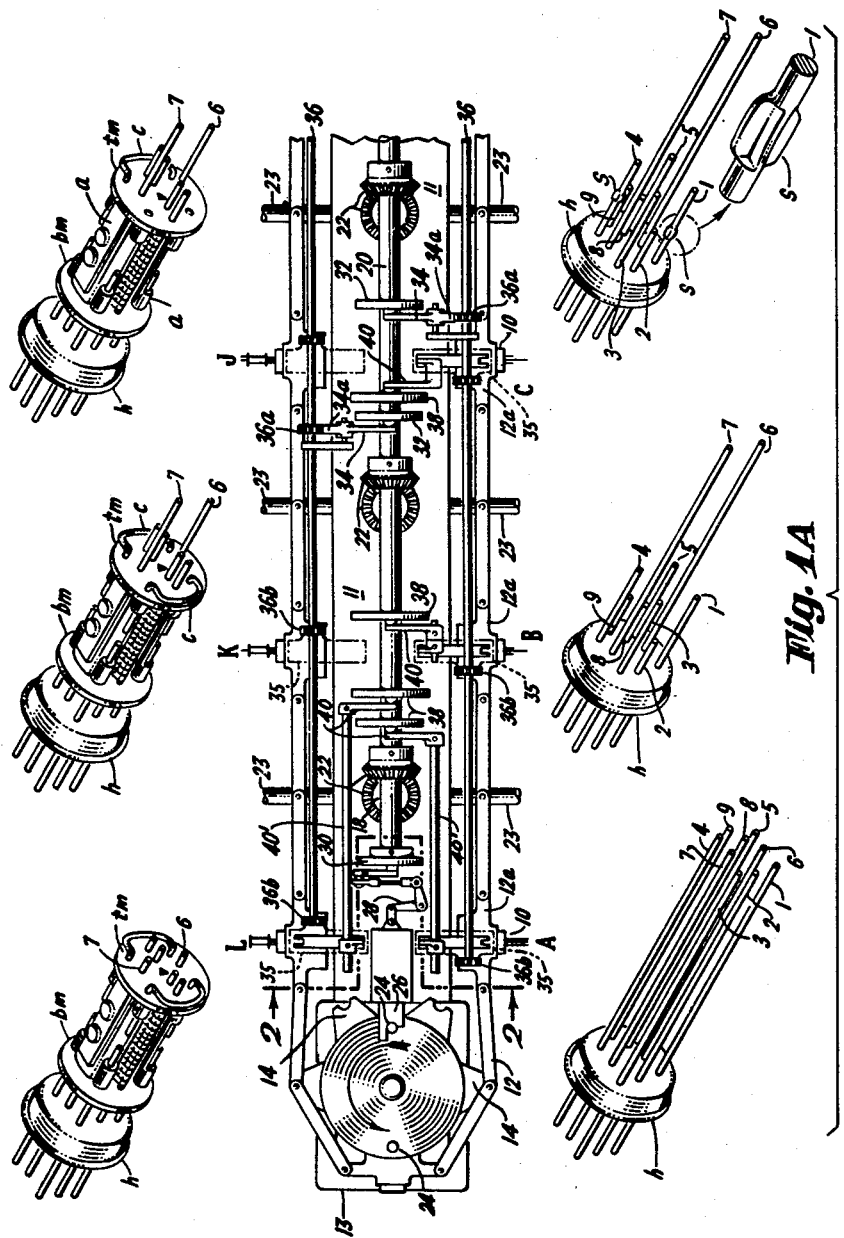

In FIGS. 1A and 1B there is shown the plan view of a conveyor 12 and associated operating mechanisms for assembling a number of electrodes to a stem made up of wires sealed in a glass header $h$. The assembly of the electrodes and the stem is termed a "mount" in the art. Such a assembly may be of various sizes, and the principles here involved with be recognized as applicable to a wide range of designs of mounts and the like. However, the present machine is particularly adapted, by the solution of numerous special problems, to the assembly of mounts of extremely small proportions. The tube used in this illustrative embodiment is a pentode having a two-part anode, a wire or rod suppressor, a screen grid, and a control grid, all of which extend parallel to the length of the tube and are fixed in relative spacing each from the others by an insulating wafer at each end of the electrode assemblies, usually of mica. The particular tube is intended to receive a filamentary cathode that is manually added to the mount after the mount is delivered by this assembling machine. The diameter of the tube being fabricated is the so-called "T–3" size, that is, approximately ⅜" outside diameter of the glass enclosing envelope.

The tube is assembled by commencing with a stem or header that is loaded into a conveyor and is transported step-wise past a series of operating stations A to L inclusive where the header wires are either shaped by cutting and swaging or where one or more of the electrodes and the micas are assembled or welded to produce the completed mount. The extremely small dimensions of the mount being assembled represent a controlling consideration throughout the machine. Thus, the machine itself forms certain of the mount parts in accurate configuration so that the part will be in perfect orientation for assembling and so that, when the sub-assembly leaving one station reaches a succeeding station, the various parts of the sub-assembly will be in accurate position and relative arrangement for the operation at that succeeding station.

In FIG. 1A three stations, A, B, and C are seen where a stem block 10 on the linked conveyor 12 comes to rest successively. At the first station A, glass header $h$ having sealed wires 1 to 9 inclusive, is mechanically loaded on the conveyor in proper position for the further operations in the succeeding stations B and C. Wires 1, 2, 3, 4, . . . 8, 9, extend from the wafer header $h$ in particular positions appropriate for succeeding operations which are effected at further stations during the travel of the conveyor between the stem-loading and unloading positions A and L.

By loading the stem into the machine with the wires 1 to 9 inclusive of equal length and longer than the longest wire needed, it becomes possible to trim the wires to lengths required during further assembly operations, all accurately in relation to a common reference, namely, the wafer header $h$. In the final part of the conveyor's traverse, there is seen a mount completed by this machine. This includes a bottom mica *bm* spaced accurately from the header *h*. The location of the bottom mica *bm* is established partly by the wires 2, 8 and 9 cut short and having their ends defining a plane against which the bottom mica is pressed. Additionally, leads 1 and 4 (which extend through the bottom mica *bm* for connection to the two anode plates) have swaged abutments at the plane of cut leads 2, 8 and 9 for supporting the bottom mica *bm*.

By loading an uncut and unswaged stem into the stem loading station A, it becomes possible to cut certain leads to critical lengths at a further station, and at a still further station to swage accurately located shoulders on certain leads, thereby defining the bottom mica plane. This may be accomplished with the assurance that, although the trimming and swaging are effected at different stations, the operations are consistently related to each other by the accurate orientation of the stem at each of the stations, both as to the end-wise positioning of the wire and as to the wire pattern presented at each station to the operating tools.

Wires 6 and 7 ultimately serve as suppressor electrodes, and are also utilized to support and connect the filamentary cathode. At the cutting or trimming station B, leads 6 and 7 remain uncut and are of the same full length as when received in the stem loading station A; but two other sets of leads are trimmed to different lengths, specifically leads 2, 8 and 9, are trimmed to very short lengths equal to the spacing between the glass header *h* and the bottom mica *bm*, and leads 1, 3, 4, and 5 disposed in an approximately a square pattern, are trimmed to a medium length such as to penetrate the bottom mica *bm* and extend part way toward the top mica *tm*.

In station C, two of the medium length leads, namely 1 and 4, are swaged to provide a shoulder or abutment at the same separation from the header *h* as the ends of wires 2, 8, and 9. The position of the swaged shoulders S and the cut ends of the wires 2, 8, 9 are all of a high order of accuracy because of the accurate grip of header *h* in a stem holder and the holder is located precisely at each station in the machine. It is an important feature that the header *h* is seated in its holder and is maintained in a very definite fixed plane in its traverse through the machine from station to station, and further that each of the wires, 1 to 9 inclusive, remains in a very accurately established position endwise and transversely. It will be seen that in some of the stations the accuracy of the positioning of these wires and their pattern is re-established and carefully readjusted.

It will be understood that the header *h* as formed in a stem molding machine carries the wires 1 to 9 in a pattern whose accuracy and consistency is limited, considering the requirement of stem molding dies that the wires should be loosely received; and because automatic assembling of a mount must not be impeded by variations in the pattern or distribution of the wires, stations A, B and C of the present machines are adapted to receive wire patterns of coarse tolerance and adjust the pattern of wires to close tolerance, before other parts are assembled.

In station D, the bottom mica *bm* is applied to wires 6 and 7 and pushed part way down the lengths of these wires but not to the final position where it is pierced by medium length wires 1, 3, 4 and 5 and rests against the ends of short wires 2, 8, and 9, and the swaged shoulders S of the wires 1 and 4.

At the bottom mica-applying station D (see FIG. 1B) an important principle of the machine is utilized further and again illustrated. The accurately oriented wires whose positions are fixed in the stem-loading station A and adjusted in both the cutting and swaging station B and C are to receive a bottom mica having a pattern of holes. The machine itself forms the holes immediately prior to application of the bottom mica to the wires. Thus the holes which are to be penetrated by the uncut reference wires 6 and 7 are in the proper positions and relative spacing to assure that the bottom mica *bm* can be mechanically thrust against the wire ends, in alignment with the corresponding holes. The remainder of the holes are accurately distributed to receive the medium length wires 1, 3, 4 and 5 that were correspondingly accurately adjusted in the previous stations B and C. These wires penetrate mica *bm* at a later station when mica *bm* is pressed against stops provided by the ends of short leads 2, 8, and 9.

At this station D a further mechanism is included for shifting the short wires to definite positions, when necessary, so that such wires will assuredly not obstruct the side rods of grids that are later inserted.

In the next station E (with the bottom mica *bm* supported in its intermediate position along the uncut reference wires 6 and 7) a grid *g1* is inserted into two of the holes of the bottom mica which are properly located for receiving the grid side rods. This is effected by accurate orientation of the wires 6 and 7, which act in turn to carry the pierced bottom mica into accurate position for receiving those side rods. Since the bottom mica *bm* is perforated in the machine, specifically at the station D, no precaution is required to prevent inversion of the hole pattern such as might occur if the bottom mica were formed separately and subsequently loaded into this assembling machine. Thereafter, at station E, a metal sleeve, or grid stop *gs* is formed in the machine and applied to the end of a side rod of grid *g1* that projects through the bottom mica, to hold the grid *g1* firmly against the bottom mica *bm*. This grid stop is welded to one of the side rods of the grid *g1* at the underside of the bottom mica *bm*. The sleeve *gs*, is extremely tiny, when it is borne in mind that the bottom mica *bm* is of the order of ¼″ in diameter. The grid stop is not handled as a separate part but is cut, formed, applied, and welded, entirely within station E. The spacing provided between header *h* and the bottom mica *bm* in its preliminary position facilitates the assembling and welding operations. Later, when the bottom mica *bm* is advanced to its final position, there is little clearance for application of welding tools.

The other side rod of grid *g1*, extending through the bottom mica *bm*, ultimately is disposed close to short wire 9 which terminates at the lower face of the bottom mica *bm*; and in a welding step expediently effected manually, that side rod is joined to wire 9 which constitutes the lead conductor for the #1 grid in the finished, sealed tube.

At the next station F, a second grid *g2* is mounted coaxially of and around *g1* and the side rods of the grid *g2* are forced through the accurately located holes in bottom mica *bm*; and then the subassembly of grids *g1* and *g2* and bottom mica are advanced to their final position with the bottom mica in the assembly plane defined by short wires 2, 8 and 9, and abutting against the swaged portions S of medium length leads 1 and 4.

In the grid-applying stations E and F the bottom mica *bm* is in its intermediate position during the insertion of each of the grids *g1* and *g2*. After the grids have been inserted, the bottom mica *bm* is finally seated. In the next following stations G and H two portions of a two-part anode may be successively thrust into position on opposite sides of the grids *g1*, *g2* and against the accurately located bottom mica. The two part anode includes a front part *a* on leads 3 and 4, and a second part *a* on leads 1 and 5.

In station I a top mica *tm* is pierced and applied to the long wires 6 and 7 as was the bottom mica *bm* in station D. In the following stations J and K, wire straps or "hairpins" are formed and inserted for interconnecting the two parts *a* of the anode, and to hold the top mica *tm* in place against the top edges of the anode parts. Finally, in the station L of the machine, the excessively long, previously uncut reference wires 6 and 7 are trimmed to a desired length, and the assembled mount is unloaded from the machine.

A further principle will be seen, applied repeatedly in various stations of the machine. In loading the stem into the stem blocks at the station A, the relatively fixed pattern of wires at the locations where they emerge from header h is used as a reference. In stations B and C where the wires are cut and swaged, and in the other stations where the uncut or "long" wires and electrode side rods are held, the possibility exists that any of those long wires or the electrode side rods may be deflected from the reliable pattern defined by the wires closely adjacent the header and/or by the bottom and top micas $bm$ and $tm$. In stations, B, C, and D, the long and slender wires extend to unreliable positions at their free ends. The apparatus engages the wires close to the header where the wire pattern may be relied on, and a combing pattern of tool apertures is formed and then moved perpendicularly away from the header $h$ to the position where the cutting die, the swaging die, or the mica-applying head is to engage the previously unsupported and unreliably positioned wire ends. These cutting, swaging and assembling tools then advance along the wires toward the header in a reverse stroke, to reach their final working positions.

*The Conveyor and Main Drive*

Before describing the mechanisms at the several work stations, from the stem loading station A to the final trimming and unloading station L, the novel step-wise conveyor shown in FIGS. 1A and 1B should be properly appreciated. In one respect it might be ideal if the several stem blocks 10 which hold the individual stems at spaces equal to the spaces between the various work stations were one rigid disc or turret. In that event their relative spacings might conceivably be rigidly and invariably fixed. The location of the work mechanisms would then require most remarkable precision, and thermal dimension changes would require special accommodation. In contrast, stem blocks 10 are carried by a link conveyor in the machine described, in a semi-floating condition so that they can be accurately located in each station by mechanism at that station, and to use a linked conveyor, sprocket-supported at its opposite extremities. This concept is applied in my copending application Ser. No. 790,570 filed Dec. 9, 1947. It is of special advantage that a minimum number of strong large links should be used. This minimizes stretching of the links and minimizes the total effect on the conveyor of the looseness and wear at individual pivots, contrasting in this respect from conventional chain conveyors.

Where large links are used, that are wrapped around a pair of spaced drive and guide sprockets, provision should be made for the sprocket shafts to move toward and away from each other as each large link approaches a sprocket, swings around the sprocket, and then leaves. This motion should be minimized to avoid excessive stresses on the conveyor with resulting unreliable positioning of the work holders in the work stations. This sprocket motion is minimized by using an odd number of large links, to insure the presence of one link at only one sprocket, that extends across the line of the two sprocket shafts, while at the opposite sprocket a pair of links form a V-configuration. This condition of a "flat" link at one end and V links at the other changes as the conveyor advances with this V first at one sprocket and then at the other. The arrangement promotes smooth conveyor operation. Because of the large size of the individual links, one of the sprockets is mounted with a yielding bearing permitting sliding movement toward and away from the opposite fixed-shaft sprocket. If a flat link were to pass around a sprocket at one end and a corresponding flat link were to pass around a sprocket at the opposite end, followed by the V-joint between the two links being disposed at one end of the conveyor and a corresponding V-joint at the opposite sprocket, then the yieldably supported sprocket would "bounce" excessively, perhaps to a damaging degree. Also, vibrations would be produced which are undesireable especially in a delicate assembly operation as is here involved.

Accordingly, conveyor 12 is made of an odd number of links 12, forty-five in the present case, each third link 12a bearing a stem block 10. There are twelve work stations in the machine, with one stem block at each station and with three additional stem blocks in transit around the end sprockets 14 and 16. The end sprocket 16 has a suitable bearing 17 that is horizontally slidable to and from the end sprocket 14, and is spring biased away from sprocket 14, for tensioning conveyor chain 12. The conveyor 12 advances step-wise around bed 11. A main drive shaft 18 driven from a motor (not shown) is provided which furnishes power to a suitable intermittent rotary drive transmission 13 (see FIG. 1) effective for indexing sprocket 14, 180° at a time followed by idle intervals. A specially desirable form of such intermittent drive transmission 13 for this machine is disclosed in my copending application Ser. No. 294,902 filed June 21, 1952. Since sprocket 14 has six radial sprocket teeth spaced one conveyor link apart, the conveyor advances three links, identified with one stem block, for each advance of sprocket 14. Drive shaft 18 is geared to rotate shaft 20 continuously and thereby operate a series of control cams to be described, and shaft 18 is also coupled via gearing 22 to rotate a series of vertical drive shafts for furnishing continuous synchronised rotary power for shafts 23 at the various work stations spaced along the conveyer.

Sprocket 14 has a pair of pins 24 which are engaged by a locking detent 26 for arresting and locating the conveyer in the intervals when the various stem blocks are disposed opposite the several work stations. During sprocket indexing motions, detent 26 is withdrawn by a linkage 28 of any convenient design operated by a cam 30 on continuously rotating shaft 20.

The drive mechanism in FIGS. 1A and 1B includes a further pair of cams 32 for rocking levers 34 which, through segmental gears 34a and pinions, 36a, cause rock shafts 36 to oscillate. These rock shafts extend along all the work stations. Their purpose is to operate the clamping mechanisms to be described for arresting and accurately locating the stem blocks 12 in the several work stations. Additionally, continuously rotating shaft 20 furnishes power for mechanically opening the various stem blocks at certain times in the sequence of operations. For this purpose shaft 20 carries a series of cams 38 which, through mechanism that includes cam followers 40 operate jaw opening wedges. The two cam followers 40 seen to the left in FIG. 1A are seen to operate through crank shafts 40' to actuate the jaw openers in the loading and unloading stations A and L.

Figure 2:
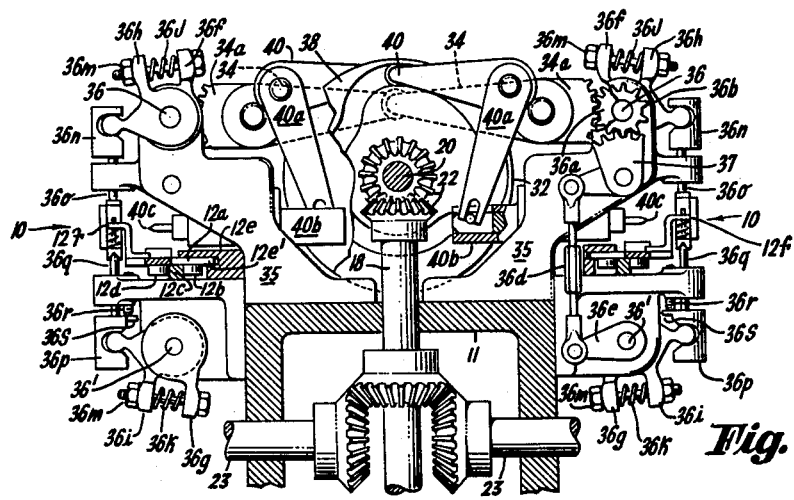
FIG. 2 is an elevation in cross-section along the line 2—2 of FIG. 1 but at larger scale, showing the jaw-opening mechanisms for the stem blocks or work holders and the drive mechanism of the several stations of the machines.

The cams shown in FIG. 1A appear in end projection in FIG. 2, together with an end projection of the locating and jaw-opening mechanism for the stem block at the respective stations. As seen in FIG. 2, each cam follower 34 at each station, caused to oscillate by a constrained cam 32 on common cam shaft 20, operates a segmental gear 34a which in turn oscillates pinions 36a (see also FIGS. 1A and 1B) on rock shaft 36 in bracket 35. A separate pinion 36b is fixed to shaft 36 at each work station, and operates through a segmental gear 37 and link 36d to oscillate a lever 36e and a rock shaft 36' in the direction opposite rock shaft 36. Fixed to each of the common rock shafts 36 at both sides of FIG. 2 is a series of arms 36f, one for each work station, and also fixed to rock shafts 36' is a further series of arms 36g. Pivotally supported on shafts 36 and 36' are additional arms 36h and 36i, respectively. Arms 36f and 36h at the respective stations are urged apart by coil spring 36j, while arms 36g and 36i are urged apart by coil springs 36k. The several sets of arms 36f–36h, and 36g–36i are held together by bolts 36m. Accordingly, as the respective arms 36f are oscillated counter-clockwise (at the left of FIG. 2) by rock shaft 36, the associated arms 36h are yieldably carried along. Similarly, as arms 36g are oscillated clockwise (at the left of FIG. 2) by rock shaft 36', arms 36i are yieldably carried along. Arms 36h at the respective stations are seen to have lateral extensions engaging vertical slides 36n, each supporting a single pin 36o, while arms 36i are seen to have extensions engaging slides 36p each supporting a vertically reciprocating pair of pins 36q. These pins are shown also in FIG. 3. Each of the slides 36p carries a stop 36s engaging an adjustable screw stop 36r fixed in the machine frame so as to limit the upward stroke of slide 36p.

The single pin 36o and the pair of pins 36q reciprocate oppositely, as a pair of jaws, for seizing the stem block 10 at times when the conveyor brings successive stem blocks oppositely, as a pair of jaws, for seizing the stem block 10 while the conveyor remains at rest. Pins 36q raise the block yieldably to a fixed limit. Pin 36o yieldably drives the block in the opposite direction.

As arms rocking levers 34 positively constrain rocking shafts 36 and 36' to oscillate the mechanisms described, springs 36j and 36k transmit the oscillatory thrust to the pin 36o and the pins 36q which seize each stem block. However, at each station, spring 36k is deliberately made substantially stronger than spring 36j and for this reason the upward stroke of the pin set 36q is more forceful than the downward stroke of pin 36o. Accordingly, the level at which each stem block is finally positioned is determined by the adjustment of screw 36r. The downward stroke of pins 36o is adequate to grip the stem blocks but not so forceful as to depress pins 36q.

The foregoing mechanism will be seen to be the mechanical analogue of the pneumatic conveyor-block gripping mechanism in my copending application, Serial No. 790,570 filed December 9, 1947.

FIG. 2 shows the constrained cams 38 and the cam followers 40 which were previously described for the purpose of operating the stem-block jaws for seizing and releasing the stems. Specifically, cam followers 40 are seen to have arms 40a for driving opposed slides 40b outwardly. These slides carrying wedges 40c which engage the stem block jaws and periodically separate the jaws at times and in stations where necessary, as will be described in detail below. The stem block jaws are opened to receive a stem in the stem-loading station A and to release the completed stem in the stem-unloading station L. Additionally, the jaws are quickly opened and closed in each of the two work stations immediately following the stem loading station, namely the lead-trimming and swaging stations B and C. It will be understood that all of the cam shafts, drive shafts and slides described have bearings in frames 11 and 35, details of which need not be described.

Figure 2A:
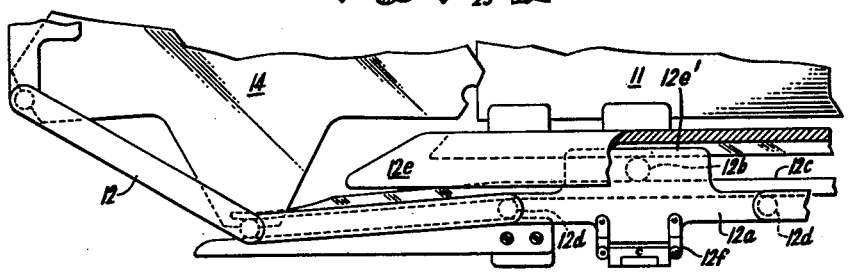
FIG. 2A is a portion of FIG. 1A at larger scale showing details of the link conveyor for the stem block and the guide mechanisms for maintaining the stem block along a predetermined path during travel through successive stations.

The links of conveyor 12 carrying the stem blocks are shown in detail in FIGS. 2 and 2A. Link 12a bearing a stem block 10 carries roller 12b and rollers 12d, behind of rail 12o and in front of rail 12c. The rollers 12b and 12d cooperate with the rail 12c to guide the chain conveyor along an accurate path through the machine. A further fixed frame plate 12e overlies rearwardly projecting plates 12e' on links 12a for preventing the links from tipping. Each of the stem-block supporting links 12a has an outwardly projecting bracket 12f for the block 10. Rollers 12d cooperate with the sprockets, while each roller 12b is received between the sprocket arms.

The operation of the mechanism described to this point will be readily understood. Main drive shaft 20 rotates continuously to drive sprocket 14 intermittently 180° at a time. Sprocket 16 is driven by the chain conveyor, and supports and yieldably tensions the chain conveyor 12. Locking detent 26 is reciprocated in timed relationship to the indexing operation of sprocket 14 for arresting the conveyor in accurate indexed position and precluding movement of the drive sprocket 14 between indexing operations. Rock shafts 36 raise the respective single pins 36o and rock shafts 36' lower the respective sets of pins 36q for releasing the stem blocks 10 during indexing and operate reversely for gripping the blocks 10 when the chain conveyor 12 comes to rest. Adjustable stops 36r, with the effect of unequal springs 36k and 36j, determine the elevation of the stem block 10 when it is locked in position. At an appropriate time in the operating cycle of the machine, while the stem blocks are gripped by cooperating pins 36o and 36q, cam followers 40 operate wedges 40c to open the stem-block jaws, the details of which are described below. The links 12a of the chain conveyor 12 which carry the stem blocks 10 are accurately guided along the path fixed by rail 12c and the cooperating rollers 12b, 12d.

Stem Blocks

Figure 4:
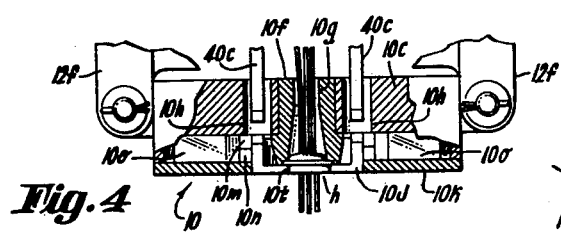
FIG. 4 is a sectional view taken substantially along the line 4—4 of FIG. 3 and looking in the direction of the arrows.
Figure 5:
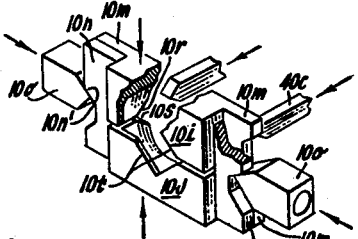
FIG. 5 is a perspective view, with parts broken away, of the stem block illustrated in FIGS. 3 and 4.
Figure 3:
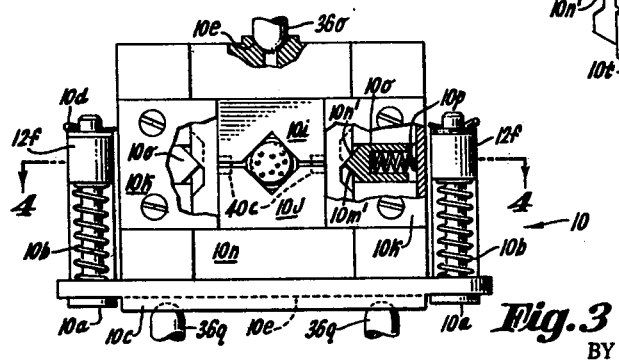
FIG. 3 is an enlarged fragmentary elevation, with parts broken away and sectioned, showing the details of the work holder or stem block.

The stem blocks 10 briefly described in connection with FIGS. 2 and 2A are shown in greater detail in FIGS. 3, 4 and 5. Each stem block 10 is suspended on the outwardly extending brackets 12f of the supporting conveyor link 12a by pins 10a extending through enlarged bores in the bracket 12f, one pin appearing at each side of the stem block 10. Springs 10b surround pins 10a and bias the body 10c downward as limited by pins 10d. Body 10c is formed with respective channeled and conical recesses 10e providing bearing seats for the gripping pins 36o and 36q. Pin 36o, in its conical seat 10e, centers the block from left to right as viewed in FIG. 3. Body 10c has a central insert 10f constituting a seat for the glass header h, the insert 10f being formed with a passage 10g for receiving the projecting wires extending from header h. In addition, a pair of passages 10h on opposite sides of the insert 10f admit jaw opening wedges 40c when projected by the cam mechanism 40, 40a, and 40b previously described.

The body 10c slidably supports a pair of vertically movable jaws 10i and 10j, disposed in front of insert 10f for pressing header h against the insert and for gripping and centering the header h. A pair of plates 10k are fixed to the body 10c for slidably confining the jaws 10i and 10j. As seen in FIG. 5, each side of upper jaw 10i has a lateral extension 10m that lies behind a similar lateral extension 10n on lower jaw 10j.

The upper and lower jaws 10i and 10j are urged toward each other by a pair of inwardly spring biased wedges 10o each of which has a compression coil spring 10p. Wedges 10o coact with sloping faces 10n' of side notches in the lateral extensions 10n of the lower jaw 10j and with sloping faces 10m' of side notches in lateral extensions 10m of the upper jaw 10i.

Inward pressure by compression springs 10p forces wedges 10o to concurrently raise the lower jaw 10j and depress the upper jaw 10i, to firmly grip the header h. The jaws force the header h firmly against set 10f by virtue of sloping header-engaging surfaces 10t of the jaws.

Jaws 10i and 10j have reversely sloping cam surfaces 10r and 10s in their rear surfaces engaged by wedges 40c when it is necessary to open these jaws.

From the foregoing, it is seen that the stem blocks 10 are relatively loosely suspended from brackets 12f of the conveyer 12 and accordingly the conveyer is only relied upon to transport the stem blocks 10 to successive positions to a first degree of accuracy. Thereafter, gripping and locating pins 36q and 36o accurately fix the location of the stem blocks 10 after the conveyer 12 has come to rest. Between those brief intervals when wedges separate jaws 10i and 10j, spring biased wedges 10o and urge jaws 10i and 10j toward each other for resiliently gripping and centering the header h and for firmly seating the header. The headers are gripped at all times, both when the conveyor is advancing and when it is at rest, except in the four stations A, B, C and L as previously mentioned. By virtue of the stem-block gripping mechanism, which accurately locates the stem-block 10 in each of the work stations, and the further header-gripping mechanism in the stem-block, the stem is successively positioned in the several work stations to a high degree of accuracy with front-to-rear and rotational orientation preserved continuously after it is once perfected.

The timing of the drive and indexing mechanism, utilized in the various stations to be described, is represented in FIG. 101. Sprocket 14 is intermittently advanced by any suitable continuous-to-intermittent drive means 13, illustrated in FIG. 101 to complete the conveyor advance in the interval 35° to 115°. Gradual acceleration and deceleration, together with rapid operation, is to be desired. Cam 30, which operates conveyor detent 26, advances the detent into the path of the next pin 24 after the pin previously released has been carried part way around with the sprocket. Firm locking of the sprocket by cam 30 and detent 26 is effected after conveyor drive has ceased.

Cams 32 operate the stem-block gripping pins 36o and 36q to seize and release the stem-block at the beginning of each cycle of operation of the tools on the stems in the respective stations, blocks 10 being locked in place as early as practicable and being released as late as practicable. This is indicated by the timing curve 32 in FIG. 101 corresponding to the drive effected by cam 32 in FIGS. 1A and 2.

Cams 38 operate wedges 40 to release the stems in stations B, C, and L, and to open the stem holders arriving in station A. Each station requires its own cam 38 and its own timing curve 38 represented, in FIG. 101, as will be appreciated when considering the various stations A, B, C and L specifically.

Stem-Loading Station A

A feature of the invention represented by the mechanism in station A involves the location of a part in a preliminary orientation followed in later stations by successive refinements in the preliminary orientation. This assures reliable performance of the assembly machine despite inaccuracies or loose tolerances in the dimensions and in the distribution of the parts involved.

An important consideration in assembling the electrodes on the stem h having the series of wires 1 to 9 inclusive molded in a predetermined pattern involves the accommodation of stems in which the highly flexible wires are in a predetermined arbitrary pattern. The wires may not be distributed in a precise predetermined pattern, due to a certain degree of required looseness of the wires when received in passages in the molding dies where the stem was formed. Much more serious is the fact of random deformation of the comparatively long and slender wires incidental to handling. After loading of stems, the machine corrects wire deformity.

The details of station A are shown in FIGS. 6, 7, 8, 8A, 9, 10 and 10A, wherein there is illustrated mechanisms for initially loading a stem into the stem block 10 previously described. The loader not merely inserts a stem into the stem block 10 but additionally predetermines the orientation of the wires 1 to 9 inclusive in relation to the stem block 10. There is no critical physical dimension which is utilized in the stem block 10 to predetermine the rotational orientation of the stem in the stem block, but instead, the stem loader itself is relied upon to insert the stem with particular wires in positions required for functioning of succeeding work station. Thus wires 6 and 7, considered as reference wires, are to be disposed one above the other in a vertical plane while the wires and the axis of the stem are horizontal. These conditions are obtained while the glass header is seated against the insert 10f in the stem block 10. Wire 7 is disposed above wire 6, and the remaining wires are distributed in the initial pattern determined by the glass molding operation. In station A, the stems are manually deposited on the blades of a feed plate turret, with no more than rough orientation required of the attendant. From this point, the mechanism performs automatically with progressively increasing precision in stem handling and in stem-wire "tailoring," including straightening, cutting, pattern-adjustment and swaging of the wires.

In FIG. 6 the general organization of the stem-loading station A is shown, the mechanism for operating certain parts being shown in FIG. 8. The stem loading mechanism includes a step-wise advanced carrier or turret 41, a set of transfer fingers 42, a pair of transfer arms 44 and 45, a split-funnel wire guide 46, and the necessary operating mechanisms coordinated as shown in the cam chart of FIG. 102. In FIG. 10A there is shown a holder 41a of the carrier 41 having a blade 41b extending between reference wires 6 and 7 arranged on one side, and wires 1, 2, and 3 on the other side. Blade 41b is approximately the maximum thickness permitted by the separation of these two groups of wires and so may be said to be tightly confined or "wedged" between them. Whether tight or loose, the stem rests on the edge of its blade and is prevented from tipping radially on the turret by the length of the blade engaged by the glass of the stem and is further prevented from tipping across the blade edge by the width of the blade engaged by the wires. Blade 41b penetrates the extending array of wires and serves to initially determine the rotational position about the stem axis in which the stem is ultimately loaded into the stem block 10.

The stems h are loaded manually or by appropriate automatic mechanism onto the respective holders 41a, conveniently at the extreme left of turret 41 as seen in FIG. 6, and from this position the stems are indexed in the clock-wise direction, when looking down on the turret. As the turret 41 indexes, the stems are carried into a transfer position between transfer fingers 42 and the adjacent stem block 10 on the conveyor 12.

Turret 41 is supported on an upright shaft 41c journaled in a fixed bearing 41d. Supported on the lower face of turret 41 is a series of cam followers 41e which (see also FIG. 7) cooperate with a constrained barrel cam 41f having an integral medial rib 41g filling the space between the two successive cam followers 41e. The rib 41g locks the turret 41 during part of the cam rotation. Additionally, barrel cam 41f has two curved runs 40h for producing the desired cam indexing motion. Barrel cam 41f rotates in a fixed bearing 41i and is driven by a sprocket and chain drive including a sprocket 41j, a sprocket 41m, and a chain 41k trained over the sprockets. The sprocket 41m is on a secondary drive shaft 41n driven through bevel gearing from unit drive shaft 41p, the latter being coupled, as described above, to the main drive shaft of the machine. A suitable single-revolution electromagnet-controlled clutch 23a is interposed in the main drive shaft connection of this unit to the main drive of the whole machine, for control by appropriate manual or automatic devices, and a like clutch is included in the drive connection of each of the other units driven by shaft 20. Turret 41 carries a stem h into range of transfer fingers 42 for each revolution of the main drive 20.

The purpose of transfer fingers 42 is to shift the particular stem on a blade 41b on to an aligned blade 44a of the transfer arm 44. Transfer fingers 42, seen best in FIG. 8 (as viewed looking toward a stem block with turret 41 removed) are swingably supported on one end of a lever 42a having a central pivot 42b and a cam follower 42c on its opposite end. The lever 42a is biased by spring 42d against upstanding edge cam 42e on the shaft 41n.

When turret 41 has carried a stem to the transfer position in front of the horizontally extending transfer fingers 42, and when transfer arms 44, 45 are in their vertical position with the blade 44a aligned with and bearing against the blade 41b (FIG. 10A) the transfer fingers 42 are operated by cam 42e to displace the stem from the turret carrier 41a to the transfer arms 44, 45. The transfer fingers 42 follow the transfer arms 44, 45 arcuately toward the stem block 10 to provide the requisite support, but are quickly returned to the position shown in FIG. 6 prior to or during the next indexing of the turret 41. Accordingly, after the turret indexes one step, the next stem will be disposed in the transfer position in front of transfer fingers 42.

The transfer fingers 42 and their supporting lever 42a, cam follower 42c and operating cam 42e are shown best in FIG. 8 wherein there is illustrated an additional novel feature. A test or detecting finger 42f is carried on an insulating block 42g to move with transfer fingers 42. In the event that no stem is present on a carrier 41a for transfer operation to a particular stem block, then an electric circuit is conditioned appropriately to suppress operation of the further assembling stations in succeeding stations which would otherwise operate on the stem carried by the particular stem block during the processing cycle. The suppression of operation of the further stations in respect to the empty stem block is effective in saving parts which can not be assembled for lack of a stem in the stem block. Delayed control (S.N. 790,570) disables clutches 23a.

A split-funnel wire guide 46 and associated operating mechanism, shown partially in FIG. 6, are more completely illustrated in FIGS. 8 and 8A. The guide 46 includes two pivoted arms, each having a funneled or flared portion 46c in the face 46a closest to the transfer arms 44, 45. Each arm has a smaller generally cylindrical portion 46c reaching face 46b (FIG. 6) facing stem block 10. The guide or funnel 46c is split and formed on the separate arms of the guide which swing reversely with pivoted pinions 45d and 46e. The pinion 46e is engaged by a segmental gear 46f, spring-biased to close the split funnel. Normally the funnel arms are spread apart to provide a clear passage between transfer arms 44, 45 and the stem block 10. Segmental gear 46f is positively driven downward through link 46g coupled to bell crank lever 46h. Bell crank lever 46h, pivoted intermediate its ends and rocked counter clockwise by link 46i, is coupled to a further bell crank lever 46j carrying cam follower 46k engaging edge cam 46m on the shaft 41p that is geared to shaft 41n. Spring 46q, connected to bell crank 46j, biases the linkage between segmental gear 46f and the cam follower 46k in the reverse direction. Cam 46m opens split guide funnel 46 at all times except during actual insertion of the forwardly projecting wires into the hollow stem block insert 10f.

The transfer arms 44 and 45, which receive the stems from turret carriers 41a, are effective to swing the stems from a vertical stem-receiving positon to a horizontal stem-inserting position, whereupon the stem wires are thrust endwise into the hollow insert 10f of the stem block 10, via split funnel 46. The transfer arms 44, 45 are shown greatly enlarged in FIG. 9, and their operating mechanisms appear in FIGS. 6 and 8. The transfer arm 44 has a pivot 43a journaled on a carriage 44b, the latter being horizontally slidable along a horizontal pair of guide rods 44c. The carriage 44b is biased by spring 44d toward the stem block 10, that is, in the direction of inserting a stem into the stem block 10. The carriage 44b is positively driven away from the stem block 10 by a lever 44e and cam follower 44f engaging cam 44g on shaft 41n. Lever 44e and cam follower 44f are interconnected by a long shaft 44h (FIG. 8) mounted for oscillation in fixed bearings.

As seen in FIG. 9, the transfer arm 44 has a rearward extension 44i which is capable of swinging clockwise under action of torsion spring 44j to engage a stop 44k on carriage 44b. The cooperating extension 44i and the stop 44k accurately arrest the transfer arm 44 in the horizontal stem-inserting position. The transfer arm 44 has a cam follower 44n bearing against stationary cam 44m. Arm 44 is raised from the horizontal when carriage 44 moves away from the stem block 10. When the transfer arm 44 and the integral cam follower 44n are carried with carriage 44b to the right and toward the stem block 10, transfer arm 44 is swung clockwise into horizontal stem-inserting position. This is shown in progressive stages in the first three diagrams of FIG. 10. It is seen that transfer fingers 42 push the header 41b or stem h from the turret 41 and its supporting blade 41b to the transfer arms 44, 45. In the first part of FIG. 10 fixed cam 44m engages rearwardly extending cam follower 44n to maintain transfer arm 44 in the vertical stem-receiving position.

As carriage 44b moves to the right in FIGS. 6 and 10, cam follower 44n gradually slides off the stationary cam and spring 44j urges the transfer arm 44 clockwise and into the horizontal stem-inserting position with extension 44i against abutment 44k.

Transfer arm 45 is carried by pivot 45a in transfer arm 44 and biased against transfer arm 44 by a torsion spring 45b, so that the two arms may move as a unit, horizontally and arcuately as shown in the first three phases of FIG. 10. Transfer arm 45 has an integral rearwardly extending cam follower 45c, whose function will be clear from the following.

The purpose of transfer arm 45 becomes apparent from the third and fourth views of FIG. 10 where the stem h is seen to extend horizontally. In the event that the transfer arm 45 were omitted, there would be considerable danger that, despite the frictional engagement of the wires with blade 44a, the stem still might shift or fall from the single transfer arm 44. By the time the extending wires on the stem h enter and pass through the split-guide funnel 46, the transfer arm 45 has served its intended purpose. As carriage 44b continues its horizontal travel to the right in FIG. 10, cam follower 45c comes into engagement with a fixed cam 45d. The transfer arm 45 is thereby swung to an inoperative position of clearance, seen in the last diagram of FIG. 10. With the transfer arm 45 out of the way, the transfer arm 44 with its supported stem approaches the split guide funnel 46. After the funnel 46 has guided the leads into the stem block 10, the funnel, too, is removed and transfer arm 44 is effective to complete the insertion of the stem into stem block 10. Thereafter, jaws 10i, 10j of the stem block 10 are closed by proper coordination of the jaw-opening wedges 40c, previously described. When the stem block jaws 10i, 10j have seized the glass header of the stem, carriage 44b slides horizontally to the left in FIGS. 6 and 10, thereby withdrawing the transfer arms 44, 45 from the projecting stem wires.

The wires extending through the insert 10f of the stem block 10 ultimately will constitute the external terminals of the completed electron tube, while the wires projecting from the front face of the stem block 10 will be variously processed and used in the assembly of the mount, as will appear.

In review, preliminary orientation of the stems to be located into stem block 10 is effected with the aid of blades 41b projecting radially from turret 40 during loading of the stems onto the holders 41a. By the cooperative effects of transfer fingers 42, transfer arm 44 with its transfer blade 44a, and transfer arm 45, this orientation is maintained as the stem is inserted into stem block 10. The leads that project from the face of the stem block 10 are thus disposed in the pattern required for operations at further stations. The glass header is pressed by stem block jaws 10i and 10j with their sloping edges against the seat represented by block insert 10f.

The timing of certain cam-operated mechanism in station A is represented in FIG. 102. There it is seen that cam 44g operates carriage 44b carrying transfer arms 44, 45 to the left (FIG. 6) and to upright position near the start of the cycle. Thereafter transfer fingers 42 are advanced to bear against a stem and push it from plate 41 to arms 44 and 45. Split funnel 46m closes in front of a stem block that had just been carried to station A by the conveyor, as represented by the drop in curve 46m. Arms 44 and 45 start to travel toward the stem block near the 200 degree point in the cycle (curve 44g) and cam 42e continues to swing fingers 42 with arms 44 and 45 until those arms approach the horizontal. Carriage 44b advances arms 44 and 45 further toward the stem block while jaws 46 are closed, but near the end of travel of those arms jaws 46 open and the stem is seated in the stem block.

Cam 38 which operates the stem block jaws in station A should have a drop shortly after the conveyor comes to rest, and should have a rise while cam 44g has its dwell (305° to 320° in FIG. 102) so that the inserted stem is seized before arm 44 is withdrawn.

While one stem is being loaded into the stem block as described, arm 42 is swung to the extreme left by cam 42e, and feed plate indexing cam 41f advances the feed plate 41 one step to bring the next stem in front of fingers 42. Arms 44 and 45 then return in readiness for the next machine cycle.

The glass header may vary in diameter and in thickness; but the self-centering characteristics of the stem-block jaws, and the sloping surfaces of the jaws that engage the glass are effective to accommodate wide variations in glass dimensions.

Lead Cutting Station B

The pattern of wires as oriented in station A where the stems are loaded into the stem blocks is relatively critical in relation to the next operation at station B.

The stem loaded into the stem block 10 in the stem loading station A has wires projecting from the stem block all approximately equal in length and longer than is needed in the final mount M. A group of these leads are to be trimmed to a short length to serve as an abutment or mechanical stop for supporting the bottom mica bm, and a further group of these leads are to be trimmed to an intermediate length for penetrating and extending a limited distance through the bottom mica bm.

The stem as loaded into the stem blocks on the conveyor is centered in the stem block jaws and held against the stem block insert as a seat; but the orientation of the pattern of wires rotationally is established only to a preliminary degree of accuracy in loading station A. Both the shortest leads and the intermediate length leads are sheared in the lead-trimming station B by a die or fixed cutting member 56 which serves a further important function, namely, to orient the stem in the stem block to a more precise degree of accuracy; and, as a still further function, to bend and adjust individual wires that might have been positioned inaccurately in the glass button by the previous stem-molding operation. In vacuum tube practice, wires may be in a "pin circle" or they may have a "random" pattern so as to occupy arbitrary positions in the glass header. The present stem has an arbitrary pattern of leads; but when the parts are to be automatically assembled, those leads should be in the predetermined pattern to a high degree of accuracy. The comparatively crude distribution of leads, as they reach the present machine, where they are formed with broad tolerance and further deformed in handling, is corrected in the present station, and further perfected in the next following station.

The details of the tools at the second station are shown in FIGS. 15, 16, 16A, 17, 18 and 18A on a greatly enlarged scale. A discussion of these figures at the outset will facilitate an understanding of the more complete organization shown in FIGS. 11 through 14. FIGS. 15, 16A and 18A are views of various tools in station B from the viewpoint of the stem block 10, with the stem block removed. That is to say, the wires and tools shown are all in front of the stem block 10, and similarly in front of the glass button gripped in the stem block jaws 10i, 10j. The tools in FIGS. 15 to 18 are all illustrated on a much smaller scale in FIGS. 11 to 14 wherein the operating mechanisms are shown.

FIG. 15 shows a series of three gathering and combing tools 50, 52 and 54 at a time shortly after the cycle of the lead-trimming station B has commenced. In the position shown in FIG. 15, the blade 50 has advanced across the stem axis to receive various wires to which the electrodes are to be subsequently assembled. The teeth 50a of the combing tool 50 have tapered points to direct partly misaligned wires to one side or the other of the several teeth. In FIG. 16 it is observed that the first gathering tool 50 crosses the stem axis at a point very close to the glass button or header h. At this location where the wires emerge from the button, any bending of the wires caused by rough handling of the completed stem after leaving the stem molding machine and before reaching the machine herein disclosed, will not introduce any appreciable difficulty.

As shown in FIG. 16A, a pair of opposed gathering and combing tools 52, 54 then advance very nearly against each other along a path crossing the path of tool 50. The fingers 54a of the combing tool 54 and the fingers 50a of the combing tool 50 cooperate to form a lattice of crossed fingers which presents a pattern of apertures for accurately locating the wires. The crossed lattice pattern of the combing tools corresponds to the pattern presented by a cutter 56 into which the accurately positioned wires are to be threaded (see FIG. 16).

The apertures of the crossed lattice pattern are appreciably larger than the cross sections of the several wires. When engaged about the wires, the combing tools (FIGS. 16 and 16A) are drawn away from stem block 10 and toward the fixed cutter or die 56 and in so doing cause the ends of the wires projecting from the glass button or header to assume severally aligned positions relative to the holes 56a in the cutting die 56. The holes 56a, which correspond in number and position to the accurately aligned wires of the header, are flared to present somewhat conical mouths at the surface 56b where the wires first enter the cutting die 56.

In FIG. 17 the cycle is seen to have progressed to the point where the cutting die 56 has advanced on the patterned ends of the wires held by blades 50, 52 and 54. Thereafter, the combing tools are radially retracted along their initial path of advance, and the "stationary" cutting die 56 completes its forward stroke toward the stem block 10. Toward the end of this forward stroke the jaws 10i and 10j of the stem block 10 open briefly to allow the header h to rotate and become oriented as may be required by the confined position of the wires in the cutter 56 of the cutting die. At the conclusion of the forward stroke of the cutting die 56 the jaws 10i, 10j of the stem block 10 close on the reoriented glass button or header. The several wires extending into stationary cutter 56 are bent and given a permanent set in an accurate pattern refined, as previously noted, to much closer tolerance than is usually obtained with stem molding machines.

The cutting die 56 has a rear cutting surface 56c and an intermediate cutting surface 56d. A pair of opposed movable cutters 58 and 60 present similar cutting surfaces as surfaces 58c and 58d on cutter 58, corresponding to the cutting surfaces of die 56 (FIG. 18 and 18A). The movable cutters 58 and 60 move toward each other and across the various wires to be sheared, starting from the initial broken line position of FIG. 18A and ending at the full line position illustrated therein. In the final position of the movable cutters 58, 60, end faces 58e and 60e remain separated from each other so as not to affect the vertically aligned reference wires 6 and 7 of the stem. Thus, cutting surfaces 58c and 60c shear wires 1, 3, 4 and 5 to the prescribed intermediate lengths, while the cutting surfaces 58d and 60d shear wires 2, 8, and 9 to the prescribed short length for supporting the bottom mica bm. Wires 1, 3, 4 and 5, it will be recalled, are to extend through the bottom mica bm.

At the conclusion of the operations for accurate adjustment of the wires by bending where necessary, and shearing of the several wires to the required lengths, the cutting die 56 is withdrawn. However, before this is done, jaws 10i and 10j of the stem block 10 again close on the glass button or header h and hold it against the seat represented by insert 10f.

Figure 14:
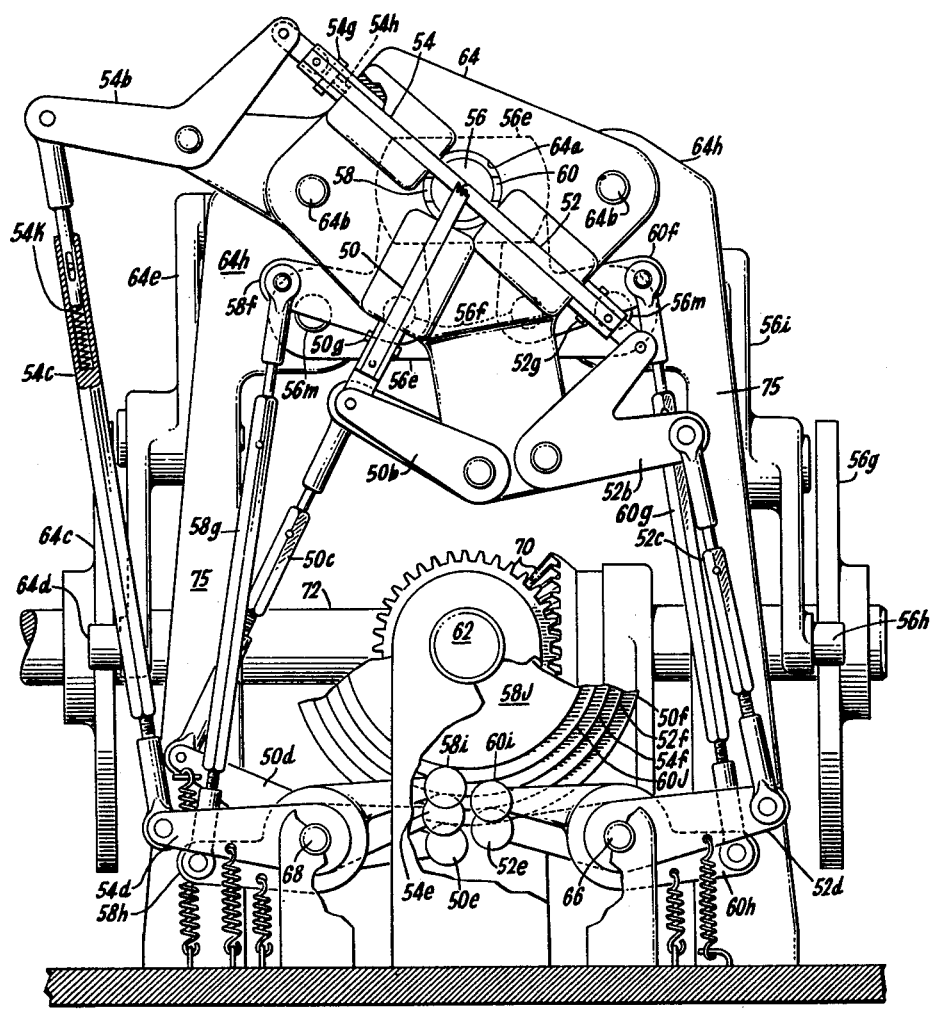
FIG. 14 is an elevation, substantially as viewed from the line 14—14 of FIG. 11 showing the operating mechanisms for moving the combing and gathering tools at the lead-trimming station.

The operating mechanisms for moving the combing tools 50, 52, 54 transverse of the stem axis, are shown in FIG. 14. Thus, each combing tool 50, 52 and 54 is operated by a centrally pivoted lever 50b, 52b and 54b, respectively, pushed through links 50c, 52c, 54c by levers 50d, 52d, and 54d operated by cam followers 50e, 52e and 54e which in turn are spring-biased to ride on cams 50f, 52f and 54f; coaxially assembled and rotated by drive shaft 62. It should be observed that the comb-operating cams 50f, 52f, and 54f, as well as cutter-operating cams 58j and 60j are all symbolically represented for clarity, their contours being such as are required for the proper timing, represented in the cam or timing chart (FIG. 103). The combing tools 50 and 52 are firmly thrust toward the stem to assume a final position determined by the adjustment of the links 50c and 52c. However, as additional mechanical stops may also be used for arresting the combing tools 50 and 52 in a precise final position as will presently be apparent. The link 54c is telescoped and has a compression spring. Thrust produced by lever 54d is transmitted through a cushioning spring 54k to the link 54b. The final position of combing tool 54 opposite tool 52 is determined by screw 54h in the rearward extension 54g of the tool 54. Screw 54h constitutes an adjustable stop that is moved against supporting head 64. Screw 54h constitutes the adjustable stop despite the somewhat greater stroke of cam 54f. Accordingly the final position of combing tool 54 across the longitudinal axis of the stem will be repeated uniformly stroke after stroke.

For reasons that will become clear presently, the supporting head 64 is reciprocable axially of the stem and perpendicularly of the plane of FIG. 14. Despite this reciprocation and the consequent change in the length of link 54c, the combing tool 54 remains in its fixed position required for effective combing of the leads. Links 50c and 52c of the combing tools 50, 52 have similar stops 50g and 52g with screws (not shown) which fix the limit of their reciprocation towards the longitudinal axis of the stem. Accordingly, as the supporting head 64 reciprocates along the axis of the stem h in combing out the leads (away from the observer of FIG. 14) the change in length of links 50c, 52c and 54c will not affect the final position of combing tools 50, 52 and 55.

Figure 11:
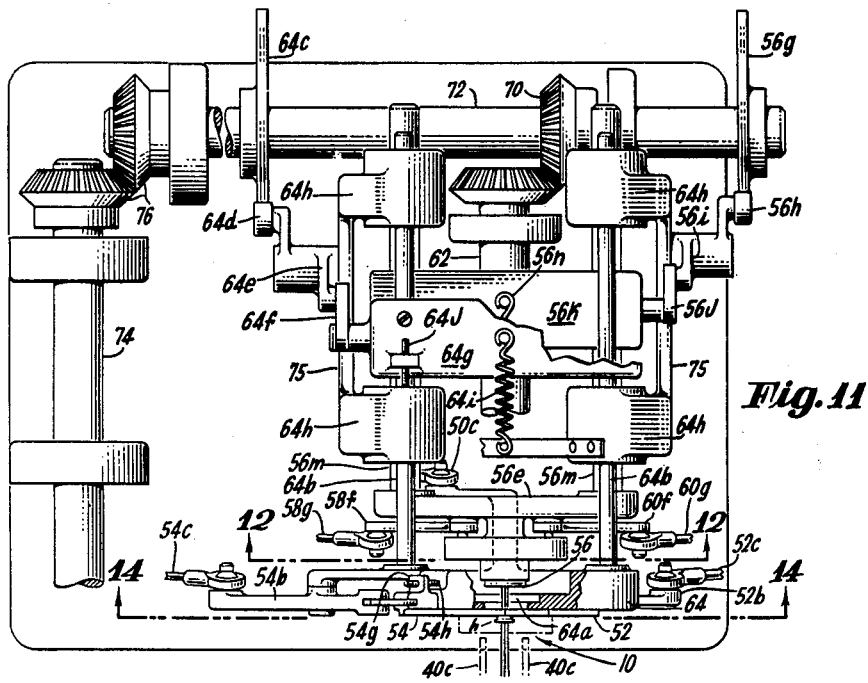
FIG. 11 is a plan view with parts broken away and sectioned showing the operating mechanisms and the general arrangement of the mechanism in the lead-trimming station B of FIG. 1A.

The "fixed" cutting die 56 is carried by a carriage 56e for movement to and from the stem blocks on the conveyer, perpendicular to the plane of FIG. 14, for projection through an aperture 64a in supporting head 64. As seen in FIG. 11, the cutting die 56 can very closely approach combing tools 52 and 54 for accomplishing the purposes illustrated in FIGS. 15 to 18A inclusive. The opposed movable cutters 58 and 60 are slidably mounted in head 56e for reciprocating movement toward and away from each other, horizontally in FIG. 13. These sliding cutters 58 and 60 are reciprocated by bell cranks 58f and 60f pivoted in carriage 56e and coupled to links 58g and 60g which in turn are connected to adjacent ends of levers 58h and 60h. At their opposite ends, the levers 58h and 60h carry cam followers 58i and 60i which respectively engage the cutter operating cams 58j, 60j mounted on shaft 62 for rotation therewith. While these cams are schematically illustrated as being the same type as cams 50f, 52f and 54f, cams 58j and 60j are actually constrained cams with the cam followers moving in grooves or tracks cut into the faces of their respective cams.

Sliding head 64 carrying comb slides, 50, 52 and 54 moves to and from the viewer of FIG. 14 with shafts 64b sliding in the frame of the machine (see also FIG. 11) and the cutter carriage 56e slides to and from the viewer (FIGS. 12 and 14) with shafts 56m. Bell cranks 50b, 52b and 54b are all pivoted in head 64 so as to move therewith fore and aft; and similarly bell cranks 58f and 60f are carried by pivots 56f in carriage 56e so as to be movable with that carriage.

Shaft 62 (FIG. 14) is coupled through bevel gears 70 to secondary drive shaft 72. Mounted on shaft 72 is a cam 56g engaged by cam follower 56h on lever 56i having a stationary pivot between its ends, lever 56i being connected through a link 56j (FIG. 11) to cutter subcarriage 56k. Cam 56g on shaft 72 positively retracts the cutter carriage 56e. This is accomplished by reciprocating carriages 56k, e that are locked to shafts 56m which in turn slide in bearings 64h in standard 75. Block 56k is normally urged forward and toward the stem block 10 by a tension spring 56n. Similarly, the head or carriage 64 for the several combing tools 50, 52, 54 is operated for axial reciprocation along the projecting stem wires by a cam 64c on shaft 72. This cam is engaged by cam follower 64d on cam follower lever 64e having a fixed pivot between its ends. This lever, through link 64f (FIG. 11) reciprocates a subcarriage 64g, carrying parallel shafts 64b which slide axially through fixed bearings 64h. Spring 64i urges the combing tool head 64, at the forward end of shafts 64b, toward the stem block 10.

The cutter head 56e, and the combing head 64 are seen to be spring-biased toward stem block 10, under cam control. An adjustable stop 64j on subcarriage 64g limits the forward stroke of the combing tool head 64, and a like stop, not shown, limits the forward stroke of the cutting die head 56.

Power input is transmitted to shaft 74 through a suitable electrically-controlled single-revolution clutch, not shown, from the main drive, as described in connection with FIG. 1. Shaft 74 is coupled by bevel gears 76 to shaft 72 which in turn drives shaft 62.

Figure 13:
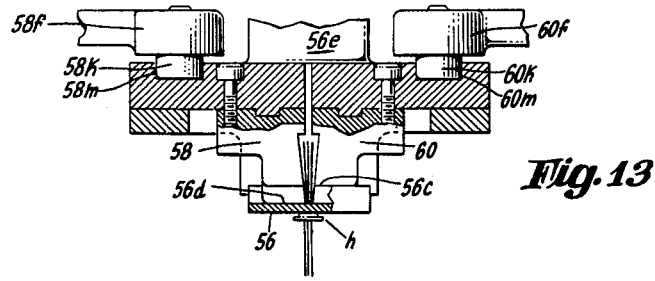
FIG. 13 is a view, partially in section along the line 13—13 of FIG. 12 and looking in the direction of the arrows.
Figure 12:
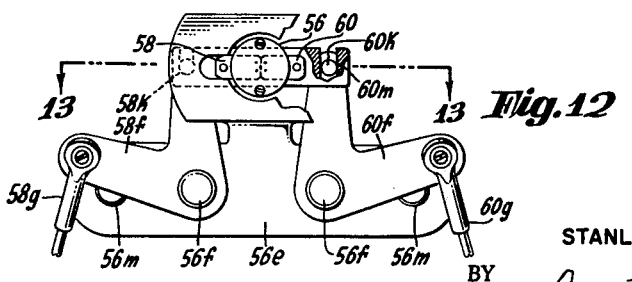
FIG. 12 is a detail view, with parts broken away and sectioned, taken along the line 12—12 of FIG. 11 and looking in the direction of the arrows, showing details of the stationary cutting die and movable cutting tools.

In the interests of clarity, a cross-section of the cutting tool is shown in FIG. 13 with fixed cutter or die 56 in front of the laterally reciprocable cutters 58 and 60. The plane of the section is broken so as to show the plane 56d at which the short wires are cut and additionally, the plane 56c at which the wires of intermediate length are cut. As appears in FIG. 12 and 13, a pin 58k operates in a slot 58m in slidable cutter 58, while a pin 60k operates in a similar slot 60m in slidable cutter 60. Opposed cutters 58 and 60 are limited in movement to avoid approaching each other so close as to contact long wires 6 and 7. Those wires are unaffected by the cutting operation and are combed and then accurately adjusted into proper position by the bending effect resulting from moving fixed cutting die 56, very close to the header in the stem block.

Cams 50f, 52f, 54f and 64c are timed (FIG. 103) so that the combing tools advance and close on a stem, and withdraw closed as die 56 is advanced by cam 56g. The combing tools separate as the cutting die moves to the header h and cam 38 briefly opens the stem block. Cams 58j and 60j operate the cutters. Thus, in station B, header h is accurately adjusted rotationally about its own axis in the supporting stem block and further the various wires are bent, where required, into the proper patterned positions on the stem. Therefore, the orientation of the various wires projecting from the stem block is adjusted to a tolerance closer than is ordinarily feasible in molding glass-and-wire stems. Furthermore, the several leads are trimmed to various lengths, certain of the leads defining an abutment plane at which the bottom mica *bm* ultimately is to be seated, while other leads are trimmed to a length suitable for penetrating the bottom mica *bm* but terminating substantially short of the top mica in the completed mount.

A prominent feature of the lead-trimming station B is the combing action by which leads, extending a substantial distance away from the glass button at which the leads are relatively rigidly located, are carefully and precisely adjusted. This permits a tool to operate precisely on each of the wires even at a great distance from the stem block where, but for the combing action, it would be futile to expect the leads to be properly disposed. This principle will be noted in several of the work stations that follow. The combing action described is seen to include a closing-in of multiple coacting jaws forming a template through which the leads extend. These jaws close on the wires at a point immediately adjacent the stem block where the wires cannot have been greatly deformed in handling the stem, and thereafter the template or apertured pattern is drawn perpendicularly away from the stem block 10 to accurately locate the free ends of the plural wires in proper condition for further processing. This stroking action is utilized in several stations. In station B it is effective for threading the wires into the apertured die block 56 for subsequent cutting, patterning and rotational adjustment of the stem. During the forward stroke of the die block 56 toward the stem block 10, accurate lateral adjustment of the several wires is brought about by bending of the wires, the header being released for rotation of the header *h* in the stem block. When the die block 56 is close to the stem block 10, the jaws 10*i*, 10*j* again grip the reoriented header.

Lead-Swaging Station C

The particular purpose of the mechanism in station C, of the illustrative mount machine, shown in FIGS. 19 to 26, is to swage multiple leads to form shoulders S against which the bottom mica *bm* may rest. These shoulders or abutments S, formed on medium length leads 1 and 4, cooperate with the short leads 2, 8 and 9 (defining the plane for the bottom mica *bm*) to assure further stability in the final mount. The swaged intermediate-length leads extend through the bottom mica *bm* and afford projections to which the anode parts are assembled and welded, as will be seen.

In addition to this swaging operation, the pattern of leads is in the station C to facilitate the swaging.

The pattern of leads and the rotational adjustment of the stem about its axis is adjusted as a further refinement of the progressive orientation by opening the stem block jaws 10*i*, 10*j* while the combing tools are quite close to the stem block 10, and while the swaging tools are effective to form the shoulder S.

The opening of the stem block jaws at the precise time that the swaging tools engage the slender leads has a further important effect. If there is even slight misalignment between the swaging tools and the leads projecting from the glass button or base of the stem *h*, it is very possible that the leads being swaged might be broken or sheared off, or the glass button might be cracked. However, since the jaws of the stem block are released during the swaging operation, the swaging tools affect the leads alone and do not tend to tear the leads away from the glass button.

Figure 23:
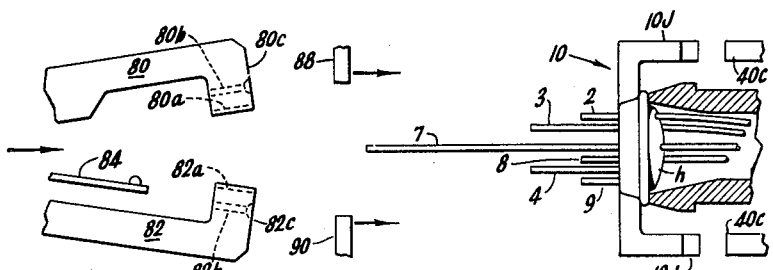
FIG. 23 is a plan view of a stem block, shown supporting a stem with the leads cut to various lengths to be worked on at the station C, with the swaging tools of FIG. 19 spaced apart and in position to advance on selected leads of the stem, and with the combing and gathering tools separated and trailing the swaging tools.
Figure 22:
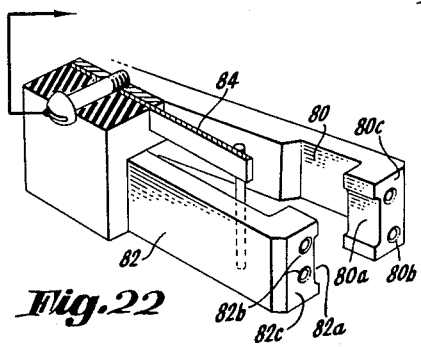
FIG. 22 is an enlarged perspective view, with parts broken away and sectioned, showing the gathering and combing tools of FIG. 19 separated and with a detecting finger interposed therebetween.

The specific mechanism and operations occurring at the swaging station C may be most easily understood from a preliminary discussion of the stem-engaging tools shown in FIGS. 22 to 26 inclusive. Similar to the combing and cutting tools in the second or cutting stage B, there are comparable combing and wire-working tools in the swaging station C. FIG. 22 shows the pair of gathering tools 80, 82 which are comparable to the combing tools 50, 52 and 54 of the cutting station and to the cutter head or die block 56 (see FIGS. 15 to 18) of the station B. Gathering tools 80, 82 have front ends formed with channels 80*a* and 82*a*. When the tools or arms 80 and 82 are brought together, the channels 80*a*, 82*a* define a guideway for receiving the long, uncut reference wires 6 and 7. As shown in FIG. 23, arms 80 and 82 are carried toward the stem block 10 together with swaging tools 88 and 90 arranged ahead of the arms 80, 82. The tools 80 and 82 are arranged to close on the reference wires 6 and 7 and accurately pick up these wires if they do not project in exact predetermined locations and truly perpendicular from the stem block 10. At the same time, a test contact 84 arranged intermediate the tools 80, 82 engages reference wire 6 or 7 to serve as a check for the presence of a stem *h* in the stem block. In the event that there is no stem in the particular block, further attempted operations with respect to the empty block are precluded by disabling the succeeding stations of the machine as that stem block arrives, as by control means in my copending application mentioned above. Tools or jaws 80 and 82 close on wires 6 and 7 before coming close enough to the stem block 10 to engage intermediate length wires 1, 3, 4 and 5. In the front or leading end of jaw 80 there is a pair of holes 80*b* which open toward the respective leads through flared mouths for receiving the ends of leads 1 and 3 in the holes 80*b* as the jaws advance toward the stem block. The jaw 82 similarly has a pair of holes 82*b* having flared ends or mouths for guiding and receiving intermediate length wires 4 and 5. Accordingly, all of the wires 1, 3, 4 and 5 enter the apertures 80*b* and 82*b* in the tool ends 80*c*, 82*c* during the final stroke of arms 80 and 82 toward the stem block 10.

Figure 26:
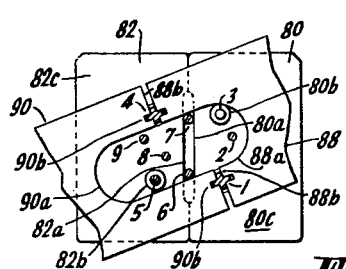
FIG. 26 is a sectional view taken along the line 26—26 of FIG. 25 looking in the direction of the arrows and showing the swaging tools engaging certain leads of the stem.

As shown in FIG. 26, leading or front ends 80*c*, 82*c* of the jaws or tools 80 and 82 have guide holes 80*b*, 82*b*, receiving wires 1, 3, 4 and 5, and uncut reference wires 6 and 7 are seen to be gathered and stroked by cooperating channels 80*a* and 82*a*.

Figure 24:
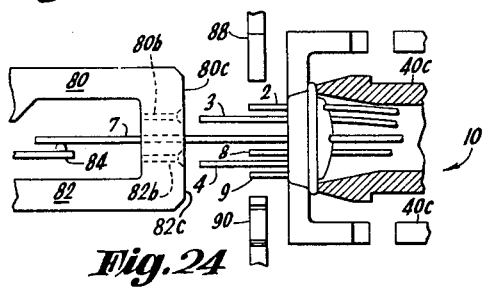
FIG. 24 is a view similar to FIG. 23 but at a later time in the cycle showing the combing and gathering tools engaged about the longest length leads in a position to be advanced end-wise along a predetermined thrust path over the intermediate length leads, the swaging tools being disposed at offset locations prior to advance transverse of the stem axis.
Figure 25:
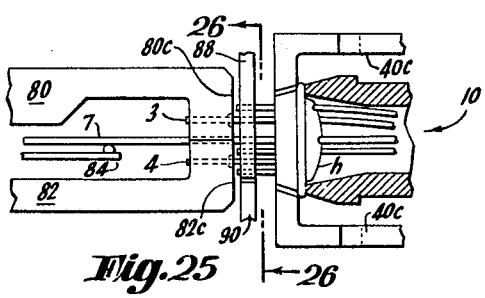
FIG. 25 is a view similar to FIG. 24 near the end of the cycle showing the combing and gathering tools advanced over the intermediate length leads, the swaging tools in engagement with the leads to be swaged, and the jaws of the stem block separated by the jaw-opening wedges so that the stem is supported by the advanced combing and gathering tools.
Figure 27:
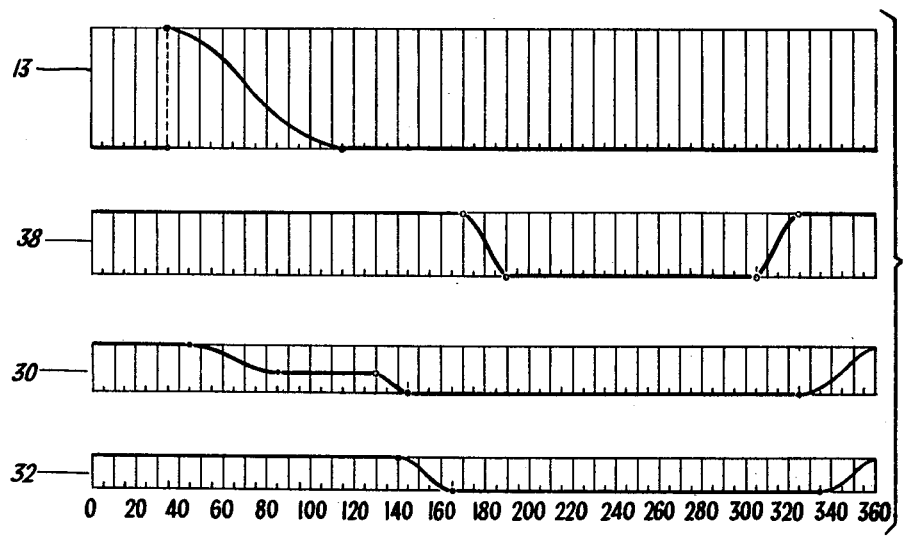
FIG. 27 is the timing chart of the conveyor and stem block operating mechanism of FIGS. 1A and 1B.
Figure 28:
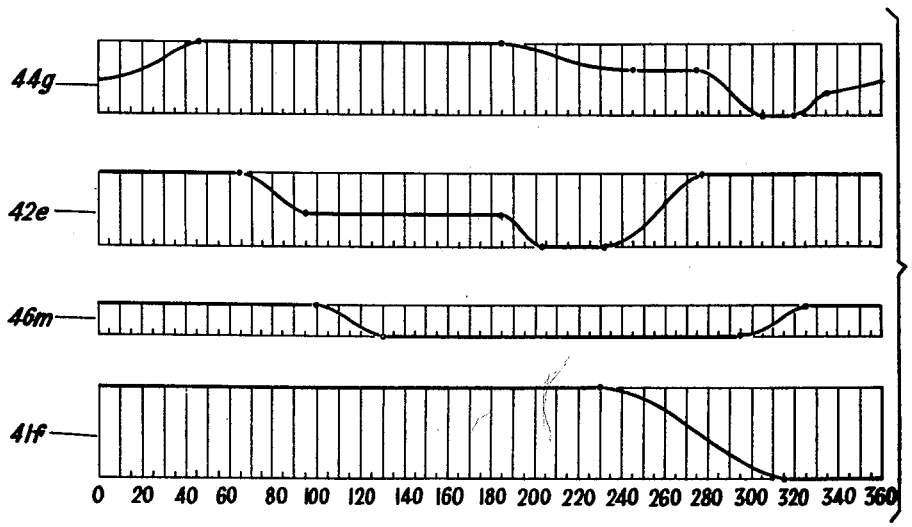
FIGS. 28, 29 and 30 are respective timing charts of the mechanism in stations A, B and C.
Figure 29:
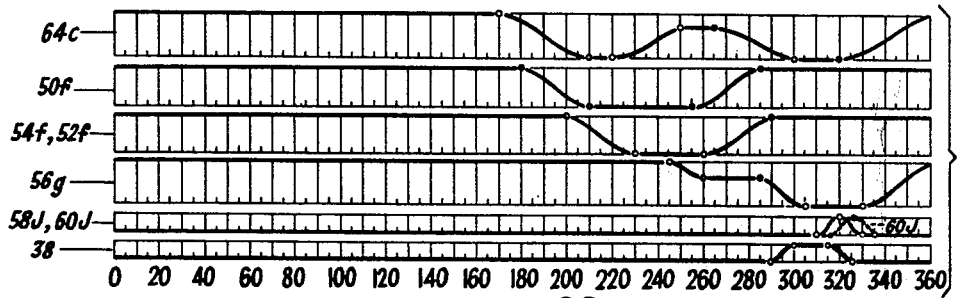
Figure 30:
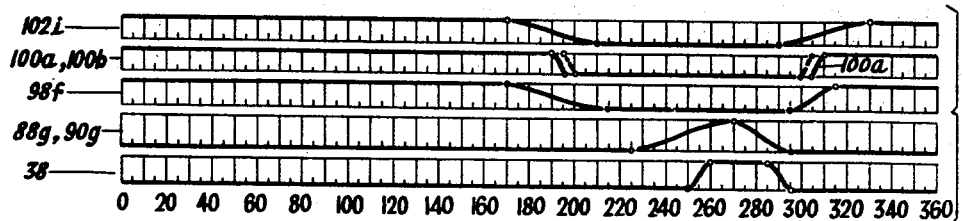

In FIGS. 24, 25 and 26 there are seen a pair of confronting swaging or lead-working tools 88 and 90 which slide in a plane parallel to the front face of the stem block and close on leads 1 and 4, moving slantwise (FIG. 26) relative to the closing path of the gathering and combing jaws 80 and 82. These leads are thus swaged to provide shoulders S at the level of the ends of shorter leads 2, 8, and 9. The swaging tools 88 and 90 have cutouts 88*a*, 90*a* in their confronting ends for bypassing all of the other leads that are not to be swaged. Leads 1 and 4, which are to be formed with shoulders S, are engaged by confronting end faces of tools 88 and 90 having appropriate female die parts 88*b* and 90*b* of the proper shape to raise or coin shoulders S. The small cross-shaped form of the swaged lead is stronger than a simple flattening of the lead, which would also produce a shoulder.

During the swaging operation (FIG. 25) cams 40*c* spread the header engaging jaws of the stem block 10 so that the stem on which the work is performed is carried not by the conveyor but by the tools in the work station. This principle is used in the preceding lead-trimming station, as has been seen; and in somewhat modified form it is applied in the stations where the bottom mica and the grids are applied, as will be seen.

Immediately after the swaging tools open, the stem block jaws close, by retraction of cams 40*c*, and the swaging and gathering tools are retracted to clear the way for the swaged stem to advance and for the next stem to enter the station.

Figure 19:
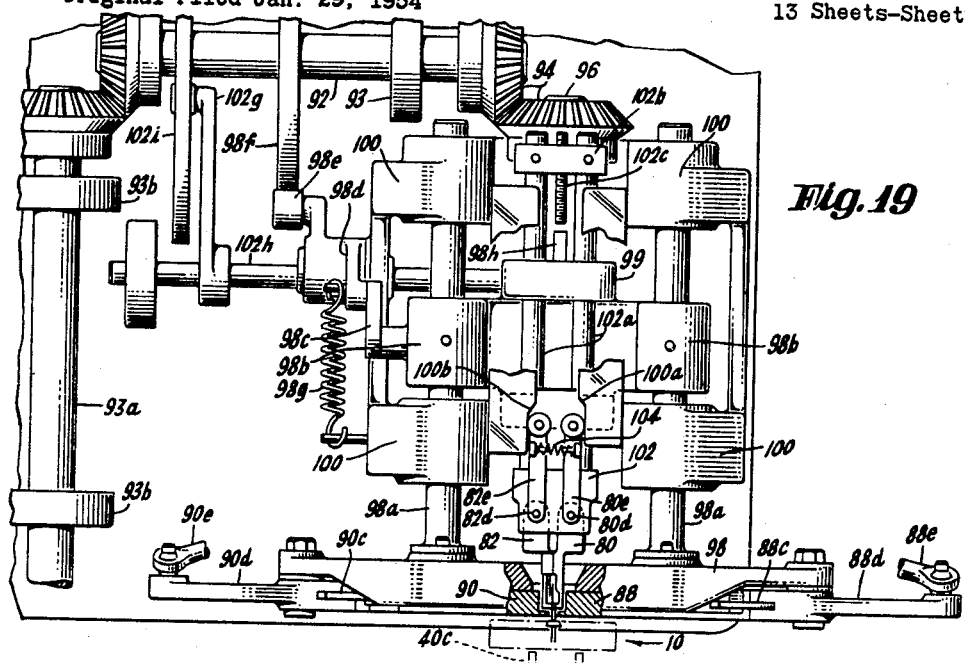
FIG. 19 is a fragmentary plan view of the operating mechanisms and general arrangement of the lead-swaging station C of FIG. 1A.
Figure 20:
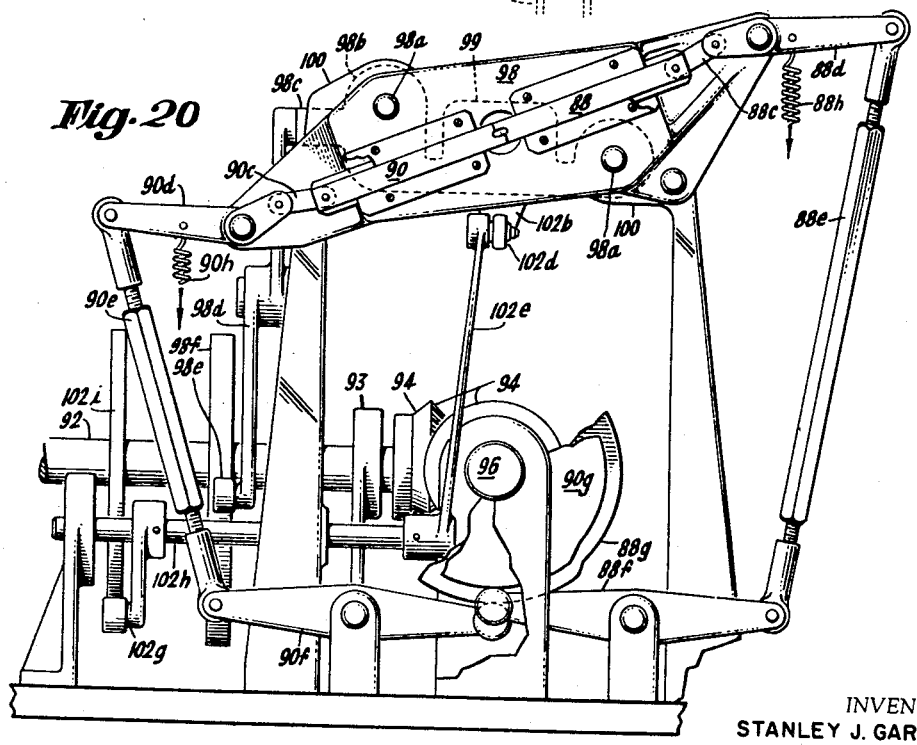
FIG. 20 is an elevation illustrating portions of the mechanism in FIG. 19, showing the respective operating mechanisms for combing and swaging tools.
Figure 21:
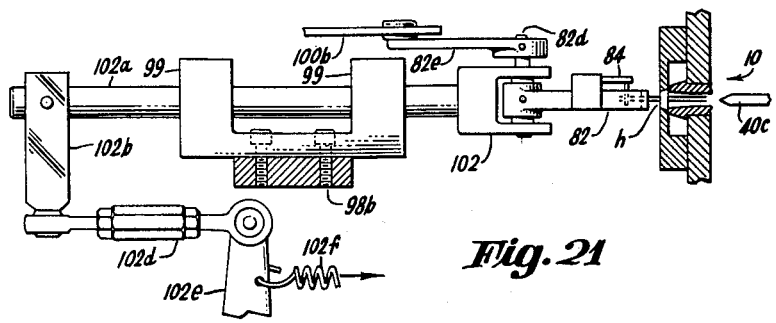
FIG. 21 is a fragmentary elevation of the tools and operating mechanisms of FIG. 19, drawn to larger scale, with the combing tools advanced on the leads of the supported stem.

The mechanisms for operating the gathering and swaging tools in FIGS. 22–26, are shown in detail in FIGS. 19, 20 and 21. Drive shaft 92, journaled in appropriate bearings 93 (only one shown) is coupled via drive shaft 93*a* in bearings 93*b* to the main drive of the machine, shown in FIG. 1, the drive shaft 92 being further coupled by bevel gears 94 to a second shaft 96.

The opposed swaging tools 88 and 90 are mounted for reciprocation toward and away from the stem block 10, that is, to and from the observer in FIG. 20. The swaging tools are carried on a carriage 98 supported adjacent the stem block 10 by the front ends of shafts 98a slidable in bearings in fixed frame structure 100. An operating head 98b for the carriage 98 is secured to shafts 98a and is reciprocated by link 98c pivotally connected to bell crank lever 98d which carries a cam follower 98e riding on a cam 98f. A spring 98g connected to the operating head 98b and to fixed frame part 100 urges the entire swaging tool structure toward the stem block 10, that is, toward the observer in FIG. 20.

The tools or jaws 80 and 82 which gather and stroke uncut reference wires 6 and 7 and further support intermediate wires 1, 3, 4 and 5 during the swaging operation, are carried for reciprocation to and from the observer in FIG. 20 by a second reciprocating structure 102 having sliding bearings in extensions 99 of the operating head 98b. Jaws 80 and 82 have pivots 80d and 82d in a sliding carriage 102 carried by a pair of axially slidable shafts 102a gripped by a rear clamp 102b. An adjustment screw 102c extends forward from the rear clamp 102b to coact with an abutment 98h on extension 99 to limit movement of carriage 102 carrying the combing tools 80 and 82 toward the swaging tools 88 and 90 on carriage 98.

As shown in FIGS. 19 and 20, and perhaps more clearly in FIG. 21, the rear clamp 102b on shafts 102a is reciprocated through a predetermined stroke by a link 102d pivoted to an arm 102e carried by pivotal shaft 102h and rocked by cam follower 102g through rotation of cam 102i on the drive shaft 92. A spring 102f is connected to arm 102e and normally biases the carriage 102 to the limit of its movement toward the stem block 10.

Gathering tools 80 and 82 are rigidly assembled to rearwardly extending arms 80e and 82e which are biased apart by an interposed coil spring 104. Rollers at the rear extremities of arms 80e and 82e coact with fixed cams 100a and 100b on frame 100 to separate the gathering tools 80, 82 during the first part of the limited stroke toward the stem block 10. The cams 100b are developed, such that when the combing tools are in position to embrace the reference leads 6 and 7, the rollers are allowed to separate under the influence of spring 104 for clamping about leads 6 and 7. The drops or dwells of cams 100a and 100b are staggered, fore and aft, so that first of the tools, namely 80 and then the other, namely 82 moves laterally toward the reference leads or wires 6 and 7. After the rollers on arms 80e and 82e, drop into the dwell portions, the rollers remain in engagement with the cams 100a, 100b and serve to accurately determine the lateral position of both the gathering tools or jaws 80, 82.

The mechanism for operating the swaging tools 80, 82 in the direction to engage the intermediate length wires 1 and 4 appears in FIG. 20. This includes links 88c and 90c, levers 88d and 90d, links 88e and 90e, cam levers 88f and 90f, and operating cams 88g and 90g on shaft 96. The cams 88g and 90g are proportioned in relation to the operating linkage to provide equal and opposite thrusts during swaging. This swaging operation takes place during a brief interval when the carriage 98 has been advanced to a very close position relative to the stem block, so that no allowance need be made for change of the effective length of the linkage during fore and aft reciprocation of carriage 98. The cams are seen to operate the swaging tools 88, 90 positively, the swaging tools being resiliently retracted by appropriate springs 88h, 90h. Additional stops may be used for more perfectly determining the final position of the swaging tools at the ends of their respective inward strokes.

In review and with the aid of the cam or timing chart in FIG. 104, it is seen that the carriage 98 is advanced toward the stem block 10 under control of cam 98f by spring bias 98g, thereby carrying swaging tools 88 and 90 toward the stem block 10. It is to be noted that the tools 88, 90 are separated sufficiently to allow all of the stem wires to pass between them. Concurrent with forward movement of the carriage 98 and the swaging tools, cam 102i controls the forward movement of the carriage 102 with its gathering tools 80 and 82. Then the tools 80, 82 travel forward sufficiently to be positioned on opposite sides of the reference wires 6, 7 the tools approach each other under control of cams 100a and 100b for centering the wires 6 and 7. After initial centering, the tools 80, 82 continue forward, sliding along the reference wires 6, 7, and support and receive the intermediate length wires 1, 3, 4, and 5 in apertures 80b and 82b. Near the end of the forward stroke of the tools 80 and 82, cam 38 opens the jaws 10i, 10j of the stem block 10 to release the stem h permitting the gathering and support tools 80 and 82 to accurately locate the wires 1 and 4 to be swaged in relation to the swaging tools 88 and 90. In this action the stem may shift bodily or rotate or both, to some extent. The swaging operation is effected at a time when the stem is oriented by the instruments at the work station, and the stem block is not wholly relied on for this purpose.

After the swaging or staking tools have operated and before gathering tools or jaws 80 and 82 start to retract, the jaws 10i, 10j of the stem block 10 close again. This preserves the perfected orientation of the stem in relation to the stem block. Thereafter gathering tools 80 and 82 retract. During the swaging operation, the ends of the swaged leads 1 and 4 as well as the ends of wires 3 and 5 are supported within the apertures in the gathering tools 80 and 82. After completion of the swaging, and reengagement of the stem h by the stem block 10, the carriages 102 and 98 are withdrawn from the projecting wires of the stem h which is thereafter allowed to proceed with the conveyor to the next station.

From the foregoing, it is seen that the stem, initially positioned in the jaws of the workholder or stem block 10 to a sufficient degree of accuracy, is, in a sense, "taken in hand" for the trimming and swaging operations in the second and third stations, the stem being released from the jaws 10i, 10j of the stem block 10 while the work is being performed. All of the wires are located in a critical pattern for entry into the fixed die or cutter 56 of station B, and in station C only the uncut reference wires 6 and 7 are roughly aligned in a preliminary operation so that wires 1, 3, 4 and 5 may be more accurately engaged by close-fitting apertures of the gathering tool. In both instances, at stations B and C, a large number of the stem wires are accurately supported and located while the glass button is freed for lateral shifting without, however, lifting away from its seat.

When the stem block reaches station L, the mount is complete, very nearly in the form delivered in the assembling machine. It is a rigid unit, with the electrodes, the micas and the stem accurately and permanently united. Several operations must still be done before this mount can be enclosed in its envelope, namely the grids are to be joined to stem wires and a cathode is to be inserted and connected in place. With other forms of electrode and mounts, the concepts in the foregoing disclosure can readily be adapted to fabricate a technically complete mount. In the present machine, the long wires #6 and #7 are to be cut shorter, and the mount is to be withdrawn from the stem block. The stem wires #6 and #7 were deliberately made longer than required in the finished stem, for their functional contribution in the assembling process. In station L, a mechanical pair of cutters trim those wires, and a pair of jaws appropriately formed are provided to grip and withdraw the mount from stem block 10. As seen in FIGS. 1A, 2 and 5 one of the cam-operated stem block mechanisms 30, 40 previously described releases the mount for unloading. In the event of misoperation resulting in a mount remaining in a stem block after leaving station L, an operator can still clear the stem block during the next machine cycle and before the stem block enters the loading station A.

The mechanism of station L is not separately illustrated and described in detail because its nature will be clear from the foregoing description to those skilled in the art.

The various features of the invention are believed amply shown and described to the extent that recapitulation might serve to confuse rather than to clarify. It should be noted that the total result of the operation of the properly adjusted apparatus is represented in the integral mount delivered which is of such excellence that rejection of a finished tube because of an electrode assembly defect is rare. This is a prominent advantage of the mechanically assembled mount over a manually assembled product.

The organized apparatus may be modified in innumerable respects. For example, the conveyor 12, while of unique construction adapted to the machine disclosed, might be dispensed with entirely in an evasive effort, and in its place manual attendants might physically move stem blocks 10 from each assembly unit to the next. Furthermore, in assembling like products of modified designs, portions of the assembling apparatus and method may be omitted or adapted to meet requirements. Consequently the appended claims should be broadly construed, consistent with the spirit and scope of the invention.

I claim:

1. A mount machine including a stem block supporting an initially oriented stem having plural leads molded into a base, and a station for trimming respective groups of leads including combing tools movable transversely of said stem axis to a lead-engaging position in close proximity to said base, said combing tools in said lead-engaging position having cooperative cutouts arranged to define a predetermined apertured pattern about said plural leads corresponding to the molded position of said leads, a cutting die spaced outwardly from said stem block and formed with lead-receiving bores in a pattern registering with said apertured pattern, means for moving said combing tools axially of said leads and toward said cutting die whereby the leads are brought into alignment with respective lead-receiving bores in said cutting die, means for advancing said cutting die through a predetermined stroke over the patterned ends of said leads and toward said stem block, and means operable in timed relation to advancing of said cutting die for retracting said tools from said lead-engaging position.

2. In apparatus having a series of stations operating on a work piece, including a wire working station, a conveyor having a series of work holders operable to seize and release work pieces and having drive means effective to carry said work holders into said stations successively, said wire working station including means engaging and locating in critical reference positions a number of wires projecting from the work piece carried by the work holder in the cutting station, wire-working means in said station operable on at least certain of said wires whose location is fixed by said locating means, and means coordinated with the work engaging and locating means and with the wire-working means for operating the work holder to release the work piece as located by the locating means, and for thereafter operating the work holder to seize the work piece prior to release thereof by the work engaging and locating means.

3. Apparatus including a work holder supporting a stem having a group of projecting leads to be worked on, a lead working station including a member having a pattern of passages with flared openings facing the work holder and arranged to advance along the projecting leads of the stem in the work holder, a lead working tool movable transverse of the projecting leads, and operating mechanism for the apertured member and for the lead working tool effective to advance the apertured member along the leads and close to the work holder, and for thereafter operating the lead working tool against selected leads supported by the apertured member.

4. Apparatus in accordance with claim 3 in which said work holder includes work-engaging and releasing jaws, said apparatus further including means coordinated with the tool operating mechanism for operating the jaws to release the stem during the operation of the lead working tools.

5. A mount machine including a stem block supporting an initially oriented stem having plural leads extending from a header in an arbitrary pattern, and a station for trimming a first group of leads to a short length to serve as a mechanical stop for supporting a bottom mica and a second group of leads to an intermediate length for penetrating said bottom mica while controlling a third group of leads without trimming them, said station including gathering and combing tools movable transversely of the stem axis to a lead-engaging position in close proximity to said header wherein said tools define a predetermined crossed lattice pattern about said plural leads, a cutting die spaced outwardly from said stem block and formed with lead-receiving bores in a pattern registering with said predetermined crossed lattice pattern, means for moving said tools axially of said leads way from said stem block and toward said cutting die whereby the ends of the leads are brought into patterned alignment with respective lead-receiving bores in said cutting die, means for advancing said cutting die through a predetermined stroke substantially parallel to said stem axis and over the patterned ends of said leads and toward said stem block, means operable in timed relation to advancing of said cutting die for retracting said tools from the path of said cutting die, said cutting die having a first and second cutting surface at different distances from the stem block corresponding to said short and intermediate lengths, and movable cutters engageable with said first and second cutting surfaces and operable substantially transverse to said stem axis and through a limited stroke so as not to reach the third set of leads while shearing said first and second groups of leads to said short and intermediate lengths.

6. A mount machine according to claim 5 wherein said gathering and combing tools include teeth having tapered points for directing partly misaligned wires into appropriate guides intermediate said teeth.

References Cited by the Examiner
UNITED STATES PATENTS 2,536,677  1/51  Brunner et al. _____ 29—25.19
2,807,866  10/57  Gartner _____ 29—25.19

CHARLES W. LANHAM, *Primary Examiner.*